US007592237B2

(12) United States Patent
Sakamoto et al.

(10) Patent No.: US 7,592,237 B2

(45) Date of Patent: Sep. 22, 2009

(54) LASER PROCESSING METHOD AND OBJECT TO BE PROCESSED

(75) Inventors: Takeshi Sakamoto, Hamamatsu (JP); Kenichi Muramatsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 10/594,892

(22) PCT Filed: Mar. 2, 2005

(86) PCT No.: PCT/JP2005/003515

§ 371 (c)(1), (2), (4) Date: Jun. 19, 2007

(87) PCT Pub. No.: WO2005/098914

PCT Pub. Date: Oct. 20, 2005

(65) Prior Publication Data

US 2007/0287267 A1 Dec. 13, 2007

(30) Foreign Application Priority Data

Mar. 30, 2004 (JP) ............................ 2004-100516

(51) Int. Cl.
*H01L 21/301* (2006.01)
*H01L 21/46* (2006.01)
*H01L 21/78* (2006.01)

(52) U.S. Cl. ....................... 438/462; 438/114; 438/460; 438/113; 438/463

(58) Field of Classification Search ................. 438/106, 438/110, 113, 114, 460, 461, 462, 463, 465, 438/660

See application file for complete search history.

(56) References Cited

U.S. PATENT DOCUMENTS 3,970,819 A 7/1976 Gates et al.

(Continued)

FOREIGN PATENT DOCUMENTS

EP 1 498 216 1/2005

(Continued)

OTHER PUBLICATIONS

Hayashi, K. "Inner Glass Marking by Harmonics of Solid-State Laser", Proceedings of $45^{th}$ Laser Materials Processing Conference, Dec. 1998, pp. 23-28.

(Continued)

*Primary Examiner*—Savitri Mulpuri
*Assistant Examiner*—Calvin Choi
(74) *Attorney, Agent, or Firm*—Drinker Biddle & Reath LLP

(57) ABSTRACT

A laser processing method is provided, which, when cutting a substrate formed with a laminate part including a plurality of functional devices into a plurality of chips, each chip including at least one of the functional devices, can cut the laminate part with a high precision together with the substrate.

In this laser processing method, modified regions differing from each other in terms of easiness to cause the substrate 4 to fracture are formed along respective lines to cut 5*a* to 5*d*. Therefore, when an expandable tape is attached to the rear face of a substrate 4 and expanded, an object to be processed 1 is cut stepwise into a plurality of chips. Such stepwise cutting allows uniform tensile stresses to act on respective parts extending along the lines to cut 5*a* to 5*d*, whereby interlayer insulating films on the lines to cut 5*a* to 5*d* are cut with a high precision together with the substrate 4.

10 Claims, 39 Drawing Sheets

U.S. PATENT DOCUMENTS

| | | | | |
|---|---|---|---|---|
| 7,288,480 | B2 * | 10/2007 | Yamaguchi et al. | 438/662 |
| 2004/0002199 | A1 * | 1/2004 | Fukuyo et al. | 438/460 |
| 2005/0272223 | A1 * | 12/2005 | Fujii et al. | 438/459 |

FOREIGN PATENT DOCUMENTS

| | | |
|---|---|---|
| EP | 1742252 | 1/2007 |
| JP | 58-107647 | 6/1983 |
| JP | 2-065156 | 3/1990 |
| JP | 2003-266185 | 9/2003 |
| JP | 2004-001076 | 1/2004 |

OTHER PUBLICATIONS

Miura, K. et al. "Formation of Photo-Induced Structures in Glasses with Femtosecond Laser", Proceedings of 42$^{nd}$ Laser Materials Processing Conference, Nov. 1997, pp. 105-111.

Sano, T. et al. "Evaluation of Processing Characteristics of Silicon with Picosecond Pulse Laser", Preprints of the National Meeting of Japan Welding Society, No. 66, Apr. 2000, pp. 72-73 (with corresponding English-language translation).

* cited by examiner (a)

FORMING CONDITION(1)

| SPECIES OF MODIFIED REGION | LIGHT-CONVERGING POSITION(μm) | ENERGY(μJ) |
|---|---|---|
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| TIME DIFFERENCE MODIFIED REGION | — | — |
| QUALITY MODIFIED REGION | 263 | 15 |
| REMAINING WIDTH: 62μm | CUT TIME: 3.70s | |

FORMING CONDITION(2)

| SPECIES OF MODIFIED REGION | LIGHT-CONVERGING POSITION(μm) | ENERGY(μJ) |
|---|---|---|
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| TIME DIFFERENCE MODIFIED REGION | 192 | 20 |
| QUALITY MODIFIED REGION | 263 | 15 |
| REMAINING WIDTH: 54μm | CUT TIME: 2.38s | |

FORMING CONDITION(3)

| SPECIES OF MODIFIED REGION | LIGHT-CONVERGING POSITION(μm) | ENERGY(μJ) |
|---|---|---|
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| TIME DIFFERENCE MODIFIED REGION | 199 | 20 |
| QUALITY MODIFIED REGION | 263 | 15 |
| REMAINING WIDTH: 43μm | CUT TIME: 2.03s | |

FORMING CONDITION(4)

| SPECIES OF MODIFIED REGION | LIGHT-CONVERGING POSITION(μm) | ENERGY(μJ) |
|---|---|---|
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| TIME DIFFERENCE MODIFIED REGION | 206 | 20 |
| QUALITY MODIFIED REGION | 263 | 15 |
| REMAINING WIDTH: 35μm | CUT TIME: 1.90s | |

*Fig.39*

| FORMING CONDITION(5) | | |
|---|---|---|
| SPECIES OF MODIFIED REGION | LIGHT-CONVERGING POSITION(μm) | ENERGY(μJ) |
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| TIME DIFFERENCE MODIFIED REGION | 214 | 20 |
| QUALITY MODIFIED REGION | 263 | 15 |
| REMAINING WIDTH: 23μm | CUT TIME: 1.99s | |

| FORMING CONDITION(6) | | |
|---|---|---|
| SPECIES OF MODIFIED REGION | LIGHT-CONVERGING POSITION(μm) | ENERGY(μJ) |
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 192 | 20 |
| TIME DIFFERENCE MODIFIED REGION | 228 | 20 |
| QUALITY MODIFIED REGION | 263 | 15 |
| REMAINING WIDTH: 5~10μm | CUT TIME: 1.62s | |

| FORMING CONDITION(7) | | |
|---|---|---|
| SPECIES OF MODIFIED REGION | LIGHT-CONVERGING POSITION(μm) | ENERGY(μJ) |
| HC MODIFIED REGION | 39 | 10 |
| HC MODIFIED REGION | 71 | 10 |
| DIVIDED MODIFIED REGION | 121 | 20 |
| DIVIDED MODIFIED REGION | 157 | 20 |
| DIVIDED MODIFIED REGION | 185 | 20 |
| DIVIDED MODIFIED REGION | 214 | 20 |
| DIVIDED MODIFIED REGION | 235 | 20 |
| QUALITY MODIFIED REGION | 263 | 15 |
| REMAINING WIDTH: 0μm | CUT TIME: 0s | |

LASER PROCESSING METHOD AND OBJECT TO BE PROCESSED

TECHNICAL FIELD

The present invention relates to a laser processing method used for cutting a substrate formed with a laminate part including a plurality of functional devices, and an object to be processed.

BACKGROUND ART

As a conventional technique of this kind, Patent Document 1 discloses the following laser processing method. Namely, a member for protecting a front face of a planar object to be processed is attached to the object, and the object is irradiated with laser light while using the rear face of the object as a laser light entrance surface, so as to form a starting point region for cutting generated by a modified region within the object along a line to cut. Subsequently, an expandable film is attached to the rear face of the object, and is expanded, whereby a plurality of parts generated by cutting the object from the starting point region for cutting acting as a start point are separated from each other. [Patent Document 1] Japanese Patent Application Laid-Open No. 2004-1076

DISCLOSURE OF THE INVENTION

Problem to be Solved by the Invention

Known as the object to be cut by the above-mentioned laser processing method is one comprising a substrate (e.g., a silicon substrate) and a laminate part, formed on the front face of the substrate, including a plurality of functional devices (e.g., an insulating film such as low-K film, TEG, or a conductive film made of a metal material or the like). When cutting such an object to be processed into a plurality of chips, each chip including at least one of the functional devices, it will be preferred if a modified region is formed within a substrate, and the laminate part is cut together with the substrate while using the modified region as a starting point region for cutting. This is because the forming of a modified region within the laminate part may adversely affect the functional devices included in the laminate part in terms of contamination, thermal influences, etc.

Importance has recently been placed on techniques by which a substrate formed with a laminate part including a plurality of functional devices is cut into a plurality of chips, each chip including at least one of the functional devices. Hence, there has been a demand for techniques by which the laminate part is cut with a higher precision together with the substrate while using the modified region formed within the substrate as a starting point region for cutting.

In view of such circumstances, it is an object of the present invention to provide a laser processing method which, when cutting a substrate formed with a laminate part including a plurality of functional devices into a plurality of chips, each chip including at least one of the functional devices, can cut the laminate part with a high precision together with the substrate; and an object to be processed.

Means for Solving Problem

For achieving the above-mentioned object, the present invention provides a laser processing method for irradiating a substrate having a front face formed with a laminate part including a plurality of functional devices with laser light while locating a light-converging point within the substrate, so as to form a modified region to become a start point for cutting within the substrate along a line to cut the substrate; the method comprising the steps of forming a first modified region along a first line to cut for cutting the substrate and laminate part into a plurality of blocks; and forming a second modified region along a second line to cut for cutting the blocks into a plurality of chips, each chip including at least one of the functional devices; wherein the first modified region is more likely to cause the substrate to fracture than is the second modified region.

In this laser processing method, the first modified region is more likely to cause the substrate to fracture than is the second modified region. Therefore, when an expandable tape (expandable film) is attached to the rear face of the substrate and expanded, for example, the substrate and laminate part begin to be cut into blocks from the first modified region acting as a start point, and then the blocks begin to be cut into chips from the second modified region acting as a start point. When the cutting starts stepwise from a larger block into smaller chips as such, uniform tensile stresses act on parts extending along the first and second lines to cut (i.e., parts to become cut sections of the chips), whereby the laminate part can be cut with a high precision together with the substrate along the first and second lines to cut. Therefore, when cutting a substrate formed with a laminate part including a plurality of functional devices into a plurality of chips, each chip including at least one of the functional devices, this laser processing method makes it possible to cut the laminate part with a high precision together with the substrate. The step of forming the first modified region and the step of forming the second modified region may be performed in any order. The first and second modified regions are formed by generating multiphoton absorption or optical absorption equivalent thereto within the substrate by irradiating the substrate with laser light while locating a light-converging point within the substrate.

Here, the functional devices refer to semiconductor operating layers formed by crystal growth, light-receiving devices such as photodiodes, light-emitting devices such as laser diodes, and circuit devices formed as circuits, for example.

Preferably, the laser processing method further comprises the steps of attaching an expandable film to a rear face of the substrate formed with the first and second modified regions; and expanding the expandable film, so as to start cutting the substrate and laminate part into the blocks from the first modified region acting as a start point, and then start cutting the blocks into the chips from the second modified region acting as a start point. When the cutting starts stepwise from a larger block into smaller chips, uniform tensile stresses act on the parts extending along the first and second lines to cut as mentioned above, whereby the laminate part can be cut with a high precision together with the substrate along the first and second lines to cut.

Preferably, in the laser processing apparatus, the second line to cut passes between first lines to cut neighboring each other. As a consequence, after starting the cutting into blocks held between neighboring first lines to cut, cutting of the blocks into chips can be started along the second line to cut.

In the laser processing method, the first and second lines to cut may be either substantially parallel to each other or intersect each other.

In the laser processing method, the substrate may be a semiconductor substrate, whereas the first and second modified regions may include a molten processed region. When the substrate is a semiconductor substrate, a modified region including a molten processed region may be formed as the first and second modified regions.

In the laser processing method, the first modified region in a part extending along the first line to cut in the substrate may have a forming density different from that of the second modified region in a part extending along the second line to cut in the substrate, whereby the first modified region can be made easier to generate fractures in the substrate than is the second modified region. Specifically, when the laser light for forming the modified regions along the lines to cut is a pulsed wave, it will be sufficient if intervals at which modified regions are formed upon irradiation with one pulse of laser light differ between respective parts extending along the first and second lines to cut, for example. When the intervals at which the modified regions are formed upon irradiation with one pulse of laser light are the same, it will be sufficient if the second modified region is formed intermittently in a part extending along the second line to cut while forming the first modified region continuously in a part extending along the second line to cut. Alternatively, a greater number of rows of first modified regions may be formed in a part extending along the first line to cut than the number of rows of second modified regions in a part extending along the second lines to cut.

Here, the forming density of a modified region in a part extending along a line to cut in the substrate refers to a ratio occupied by the modified region in the part extending along the line to cut in the substrate.

In the laser processing method, the first modified region in a part extending along the first line to cut in the substrate may have a size different from that of the second modified region in a part extending along the second line to cut in the substrate, whereby the first modified region can be made easier to generate fractures in the substrate than is the second modified region. Specifically, for example, it will be sufficient if the energy of laser light is made greater when forming the first modified region along the first line to cut, so as to make the first modified region with a greater size mainly in a thickness direction of the substrate, whereas the energy of laser light is made smaller when forming the second modified region along the second line to cut, so as to make the second modified region with a smaller size mainly in the thickness direction of the substrate.

In the laser processing method, the first modified region in a part extending along the first line to cut in the substrate may be formed at a position different from a position where the second modified region is formed in a part extending along the second line to cut in the substrate, whereby the first modified region can be made easier to generate fractures in the substrate than is the second modified region. Specifically, for example, it will be sufficient if the distance from the laser light entrance surface of the substrate to modified regions extending along the lines to cut varies between the respective parts extending along the first and second lines to cut.

In another aspect, the present invention provides an object to be processed comprising a substrate and a laminate part, formed on a front face of the substrate, including a plurality of functional devices; the object further comprising a first modified region formed within the substrate along a first line to cut for cutting the substrate and laminate into a plurality of blocks; and a second modified region formed within the substrate along a second line to cut for cutting the blocks into a plurality of chips, each chip including at least one of the functional devices; wherein the first modified region is more likely to cause the substrate to fracture than is the second modified region.

In this object to be processed, the first modified region is more likely to cause the substrate to fracture than is the second modified region. Therefore, when an expandable tape is attached to the rear face of the substrate and expanded, for example, the substrate and laminate part begin to be cut into blocks from the first modified region acting as a start point, and then the blocks begin to be cut into chips from the second modified region acting as a start point. When the cutting starts stepwise from a larger block into smaller chips as such, uniform tensile stresses act on parts extending along the first and second lines to cut, whereby the laminate part can be cut with a high precision together with the substrate along the first and second lines to cut.

Effect of the Invention

When cutting a substrate formed with a laminate part including a plurality of functional devices into a plurality of chips, each chip including at least one of the functional devices, the present invention makes it possible to cut the laminate part with a high accuracy together with the substrate.

Figure 17:
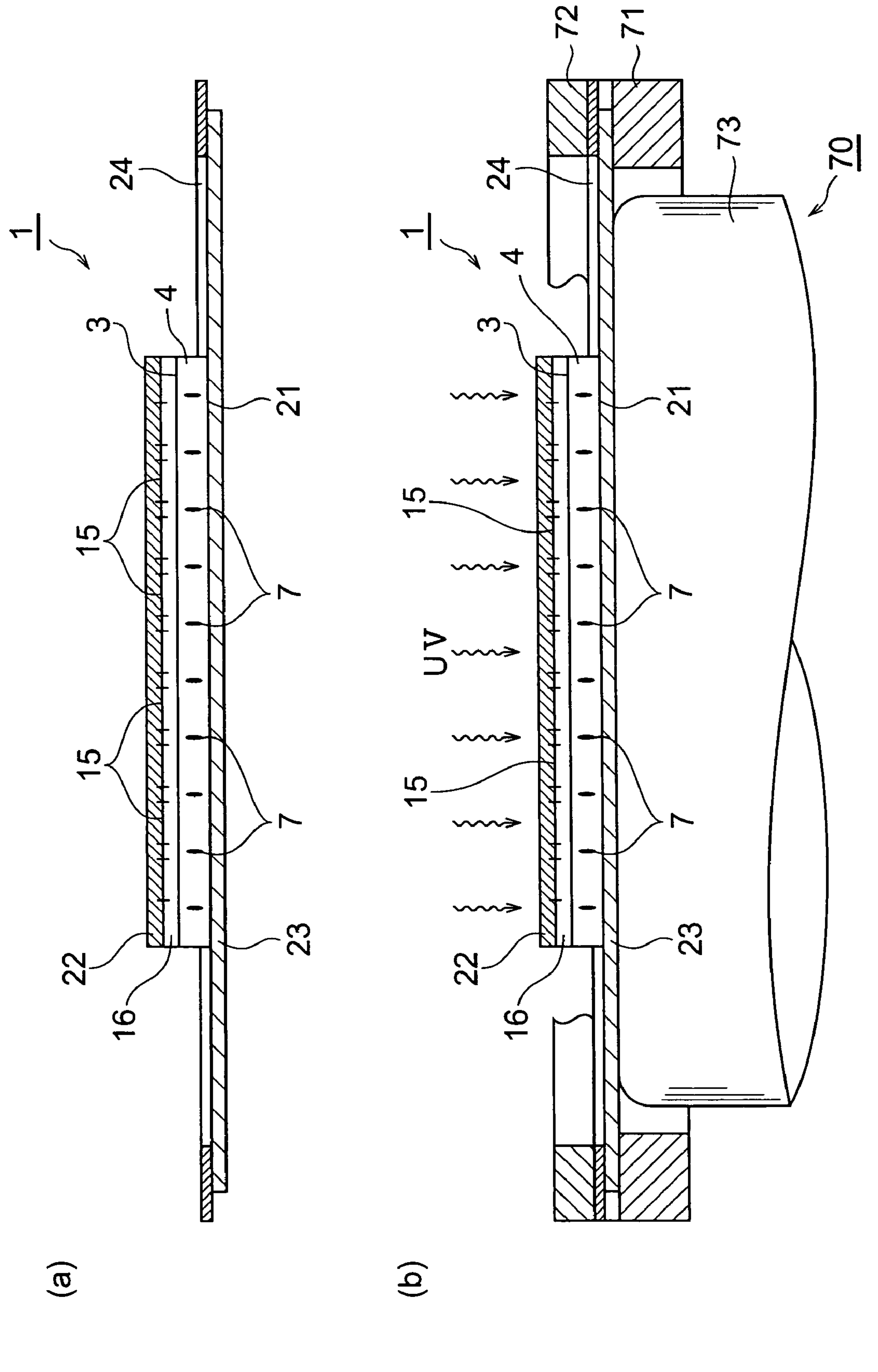
Figure 18:
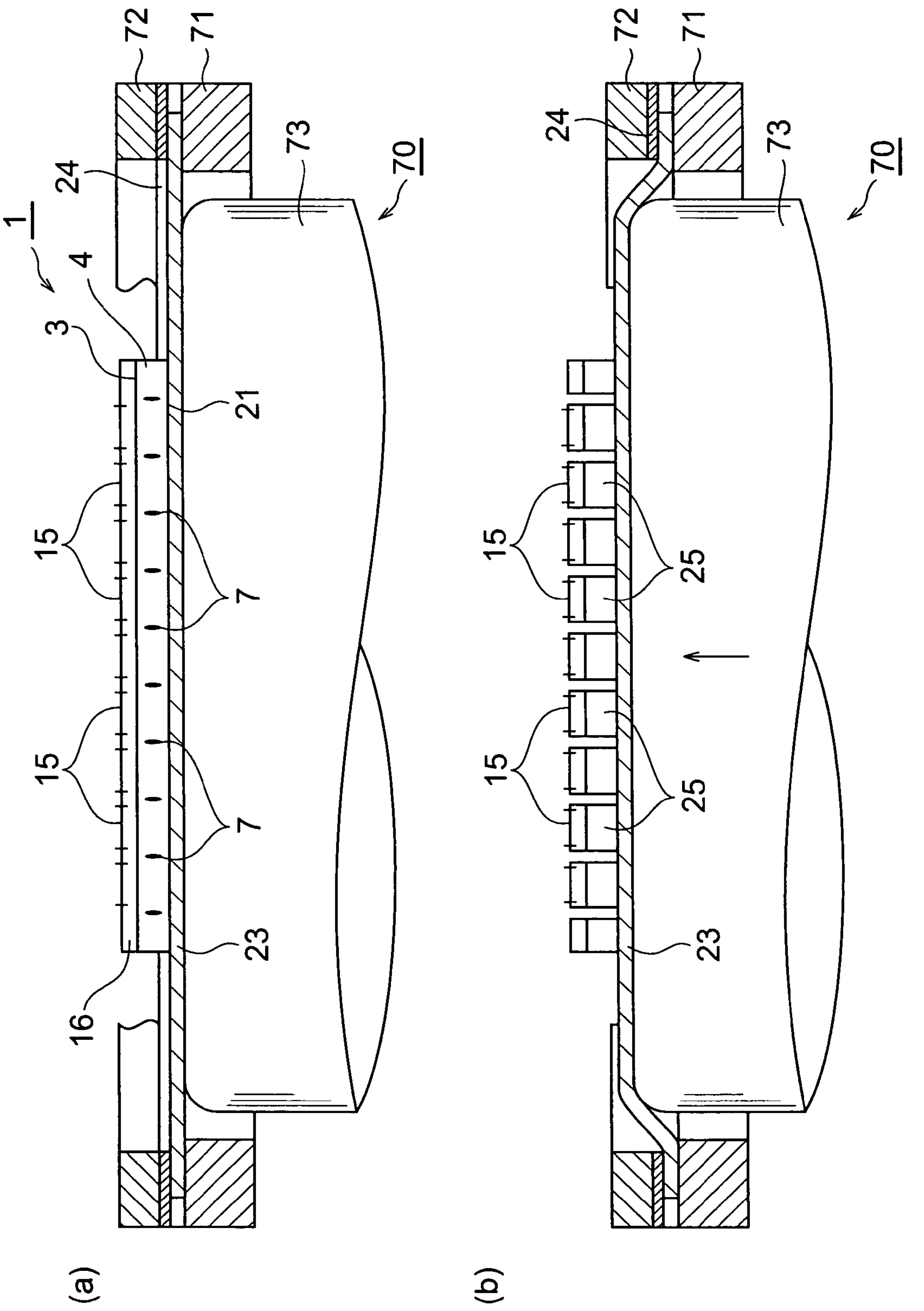
Figure 19:
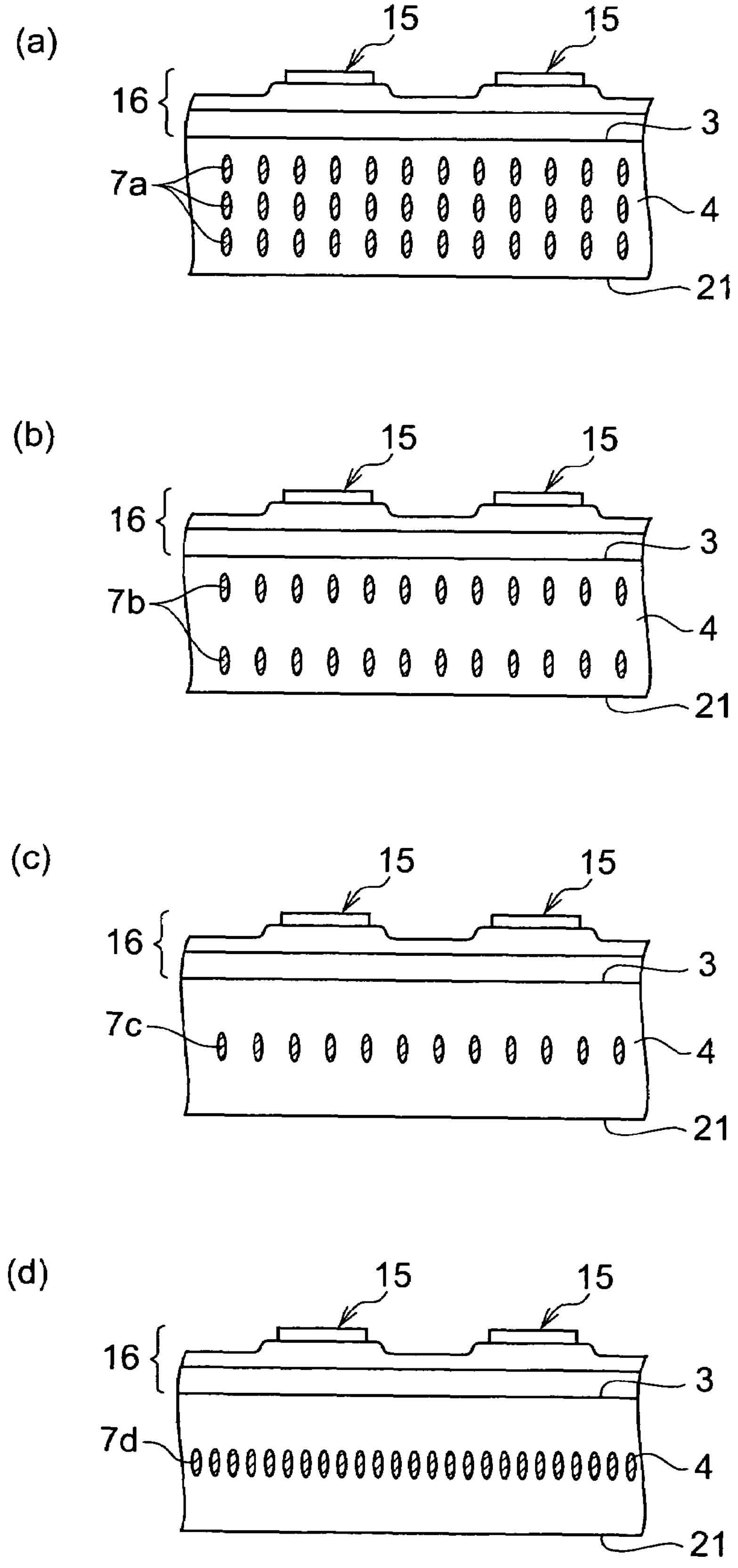
Figure 20:
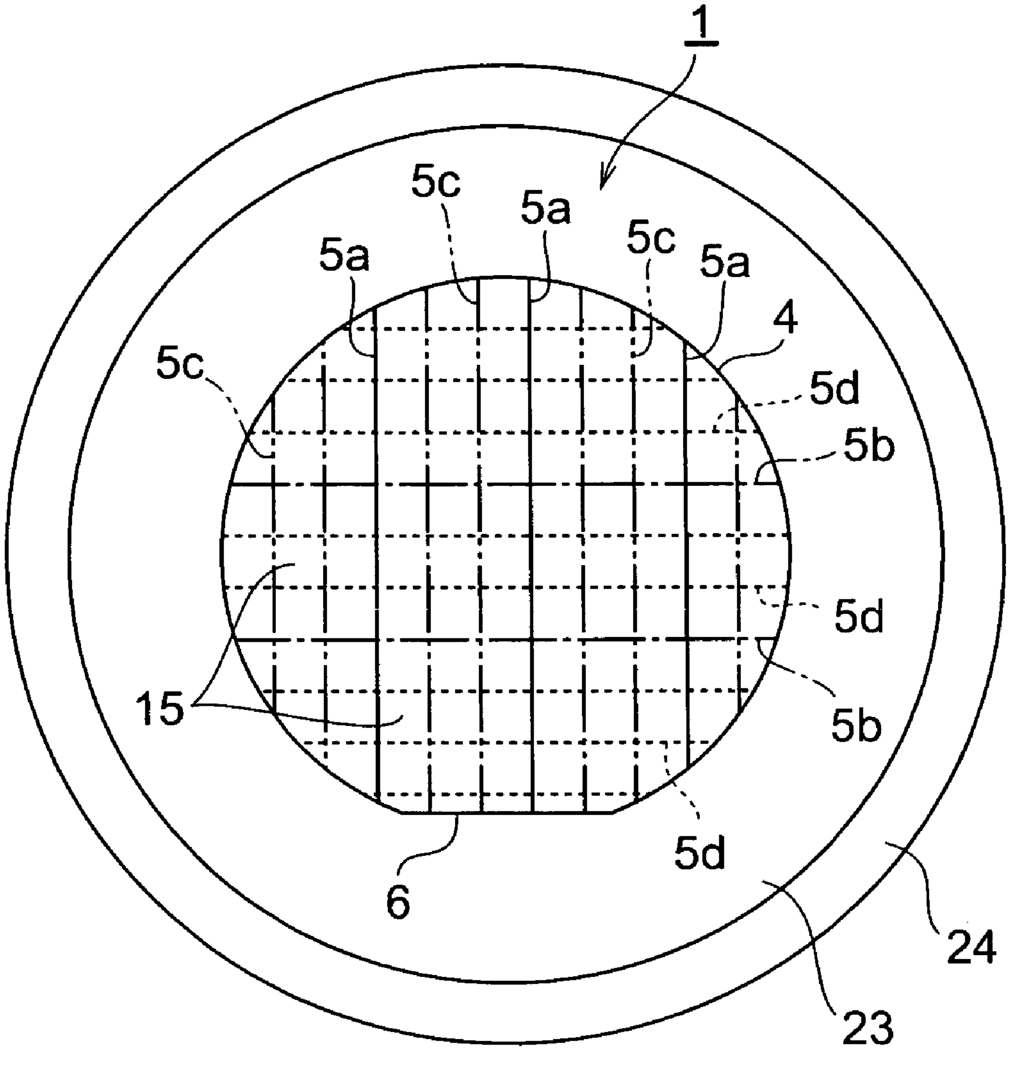
Figure 21:
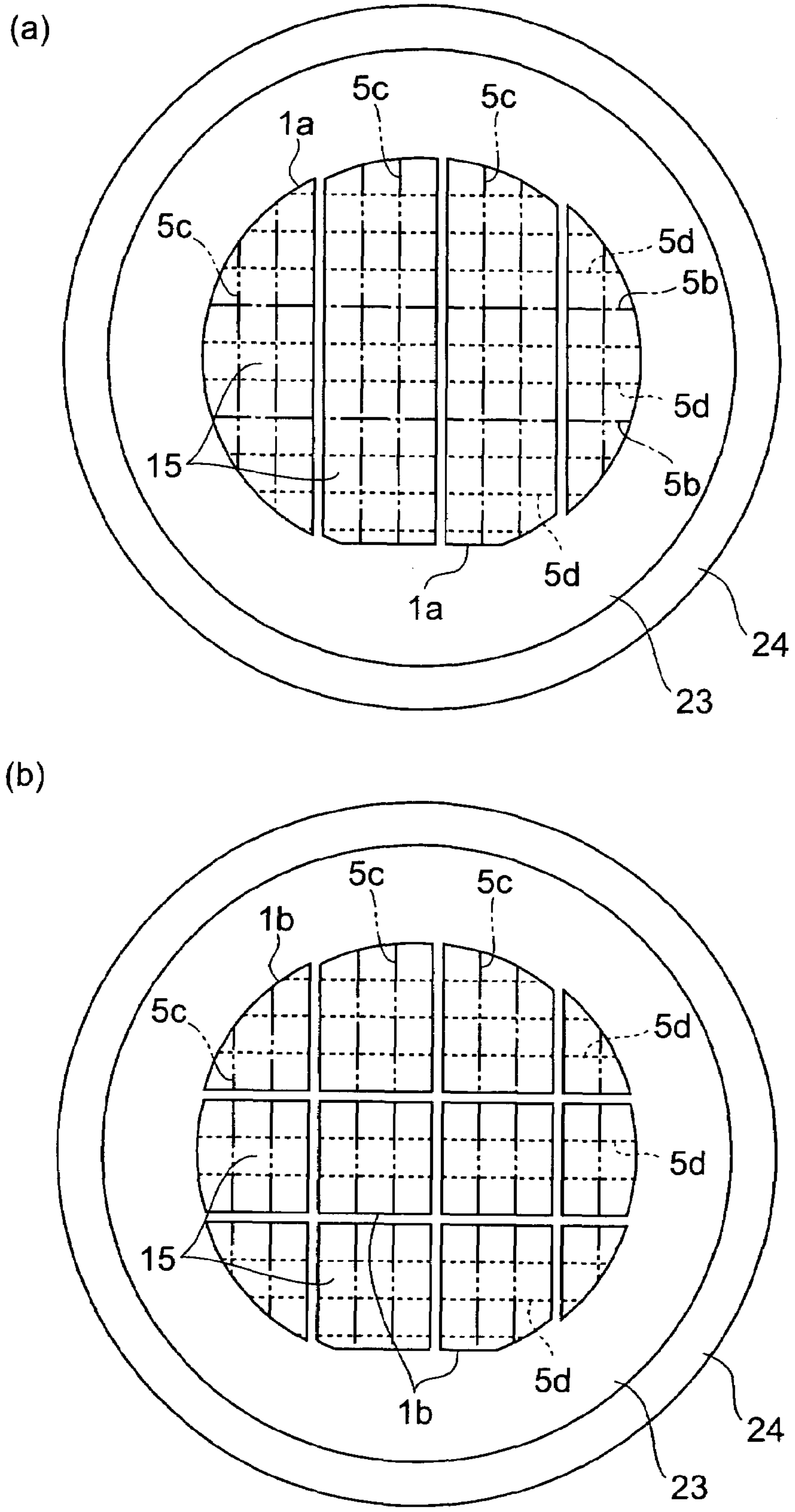
Figure 22:
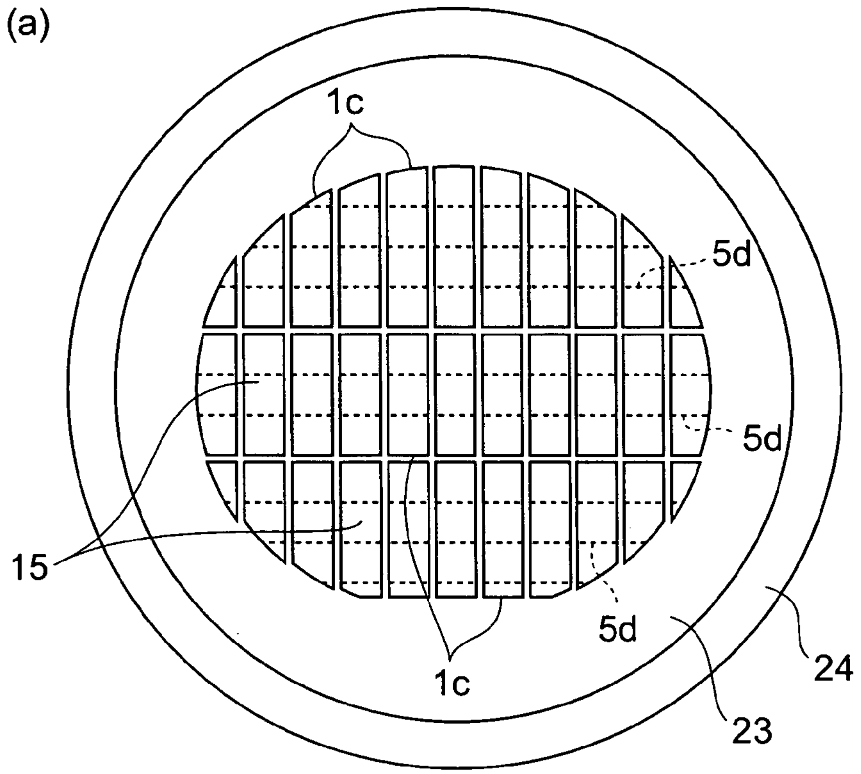
Figure 22:
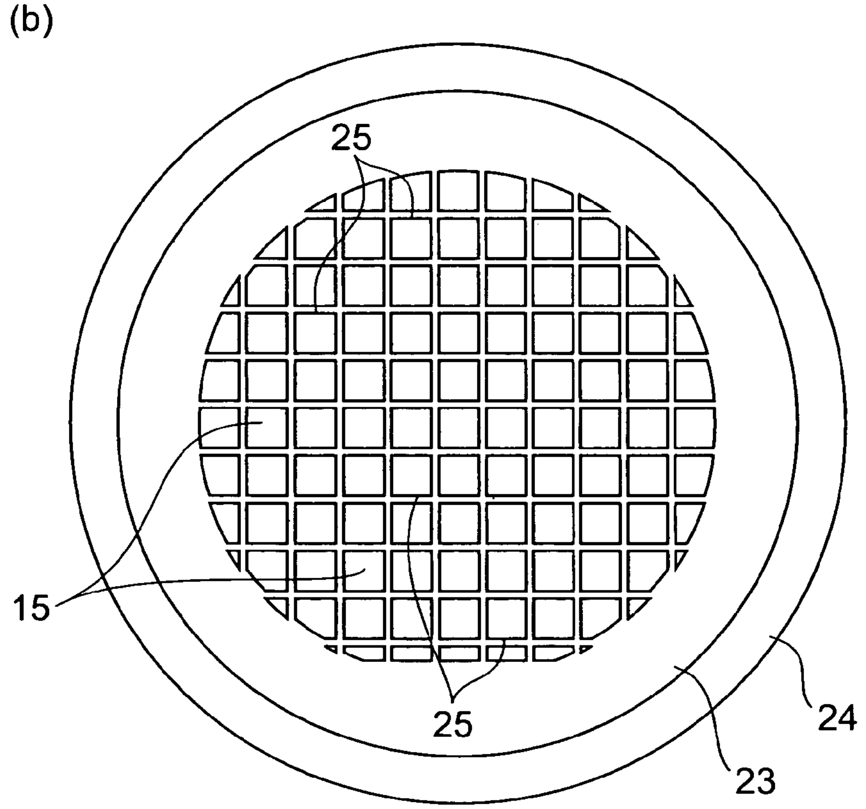
Figure 23:
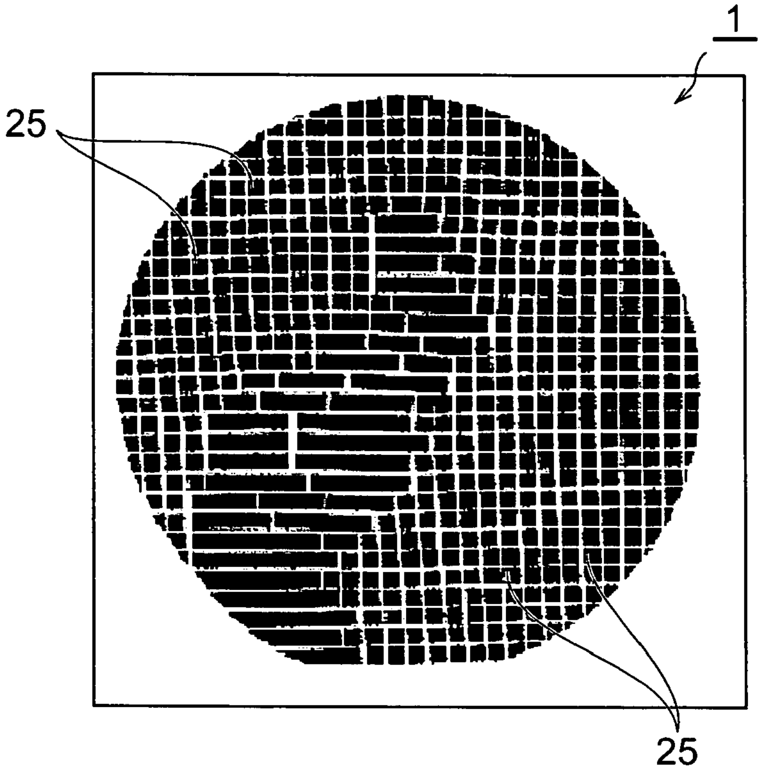
Figure 23:
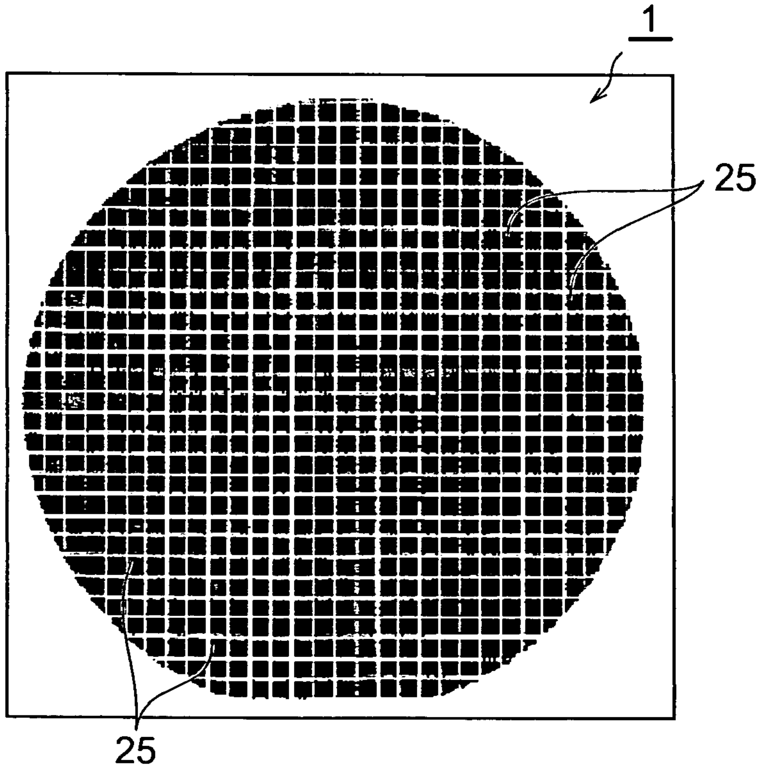
Figure 24:
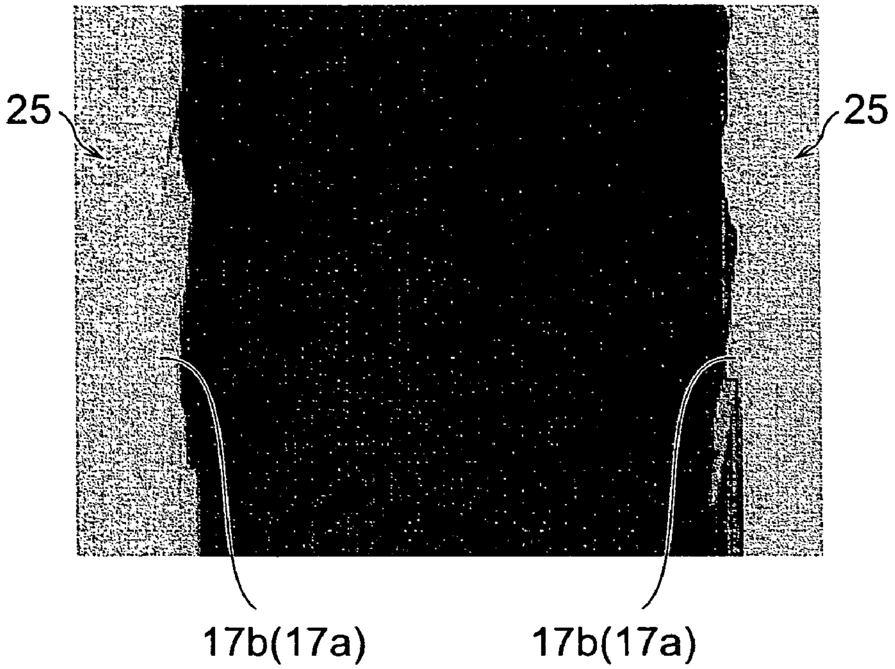
Figure 24:
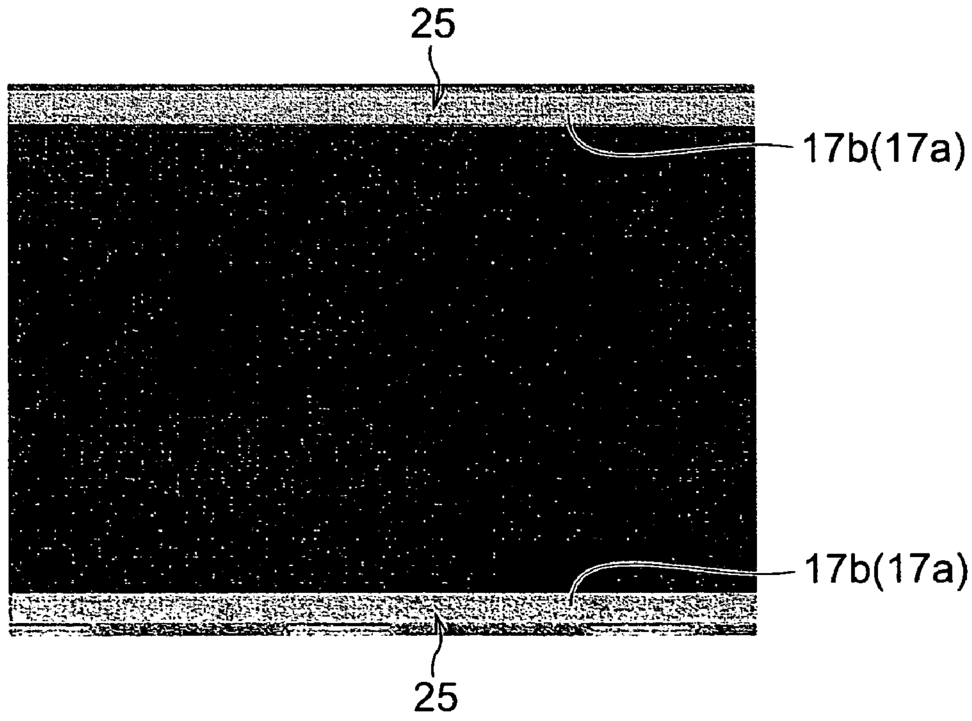
Figure 25:
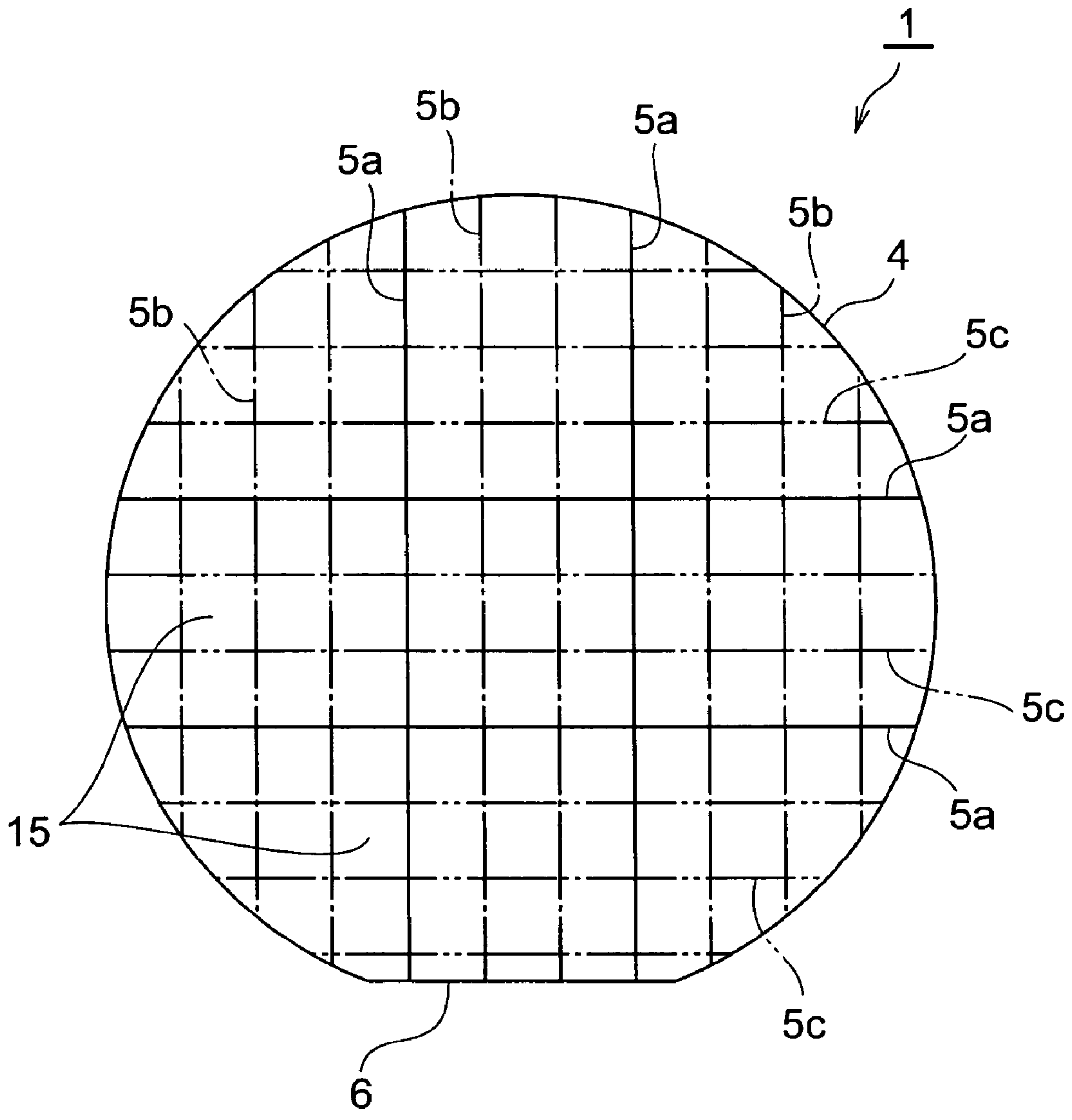
Figure 26:
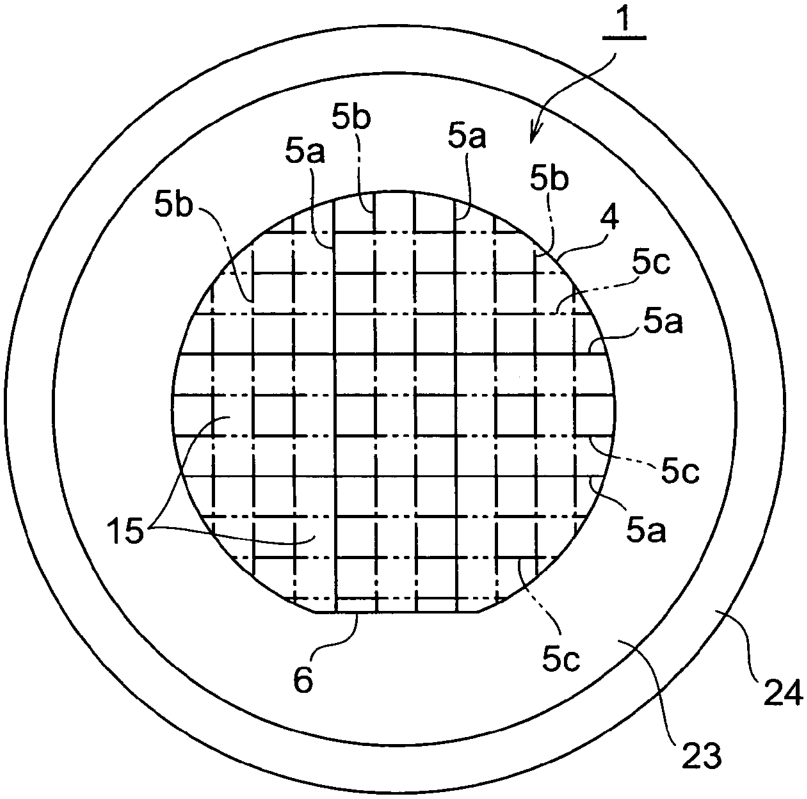
Figure 26:
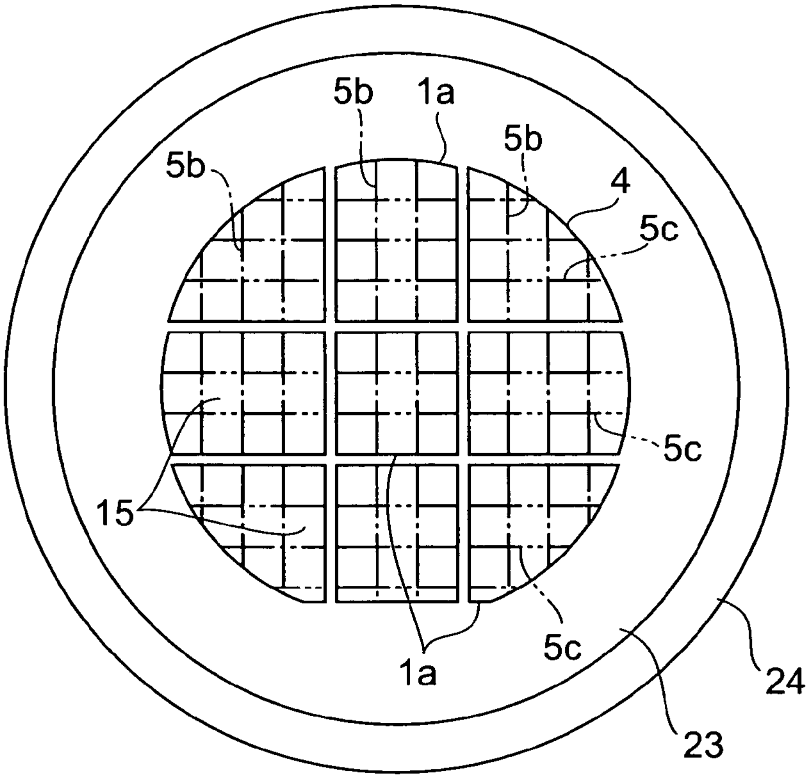
Figure 27:
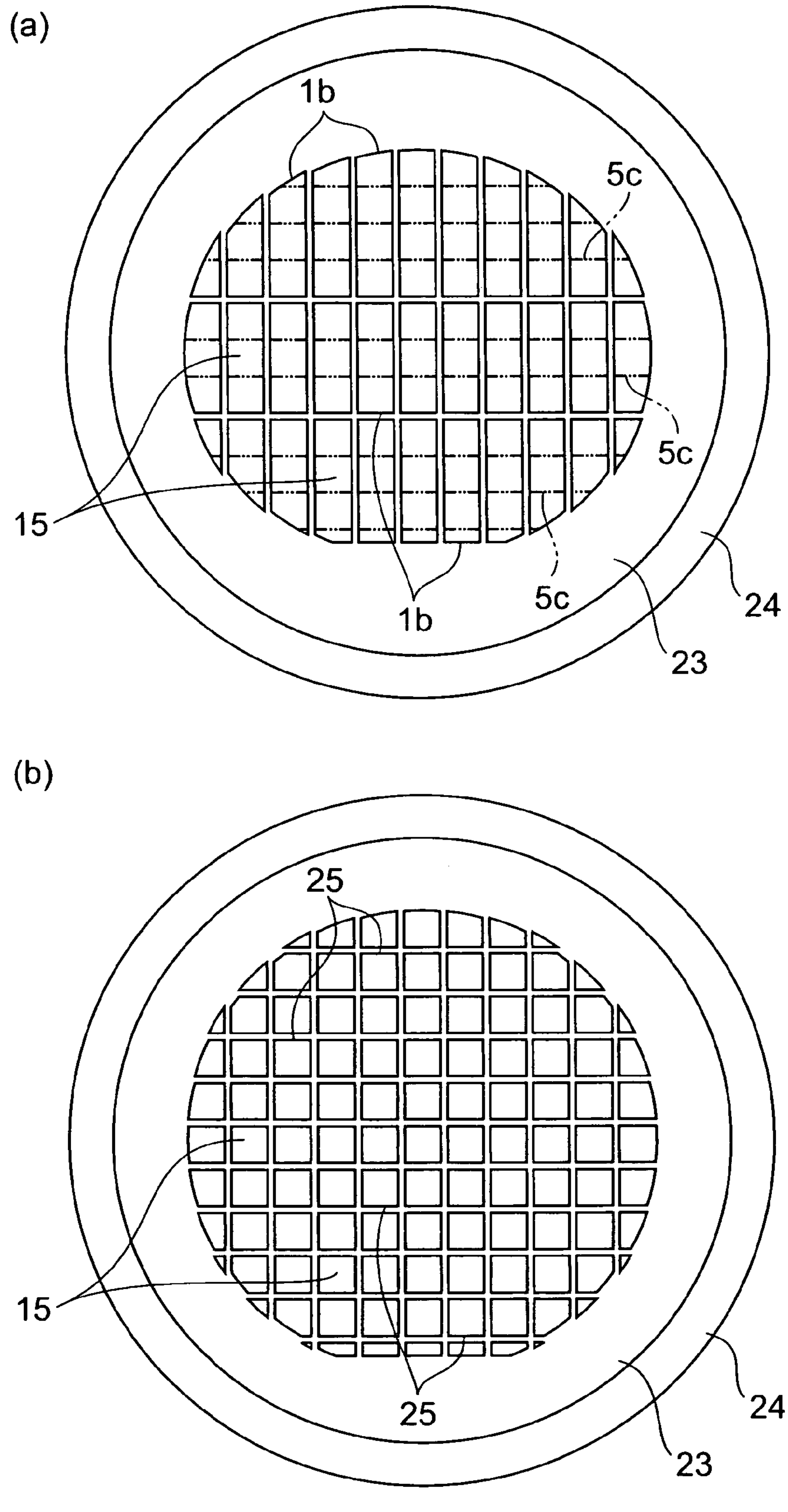
Figure 28:
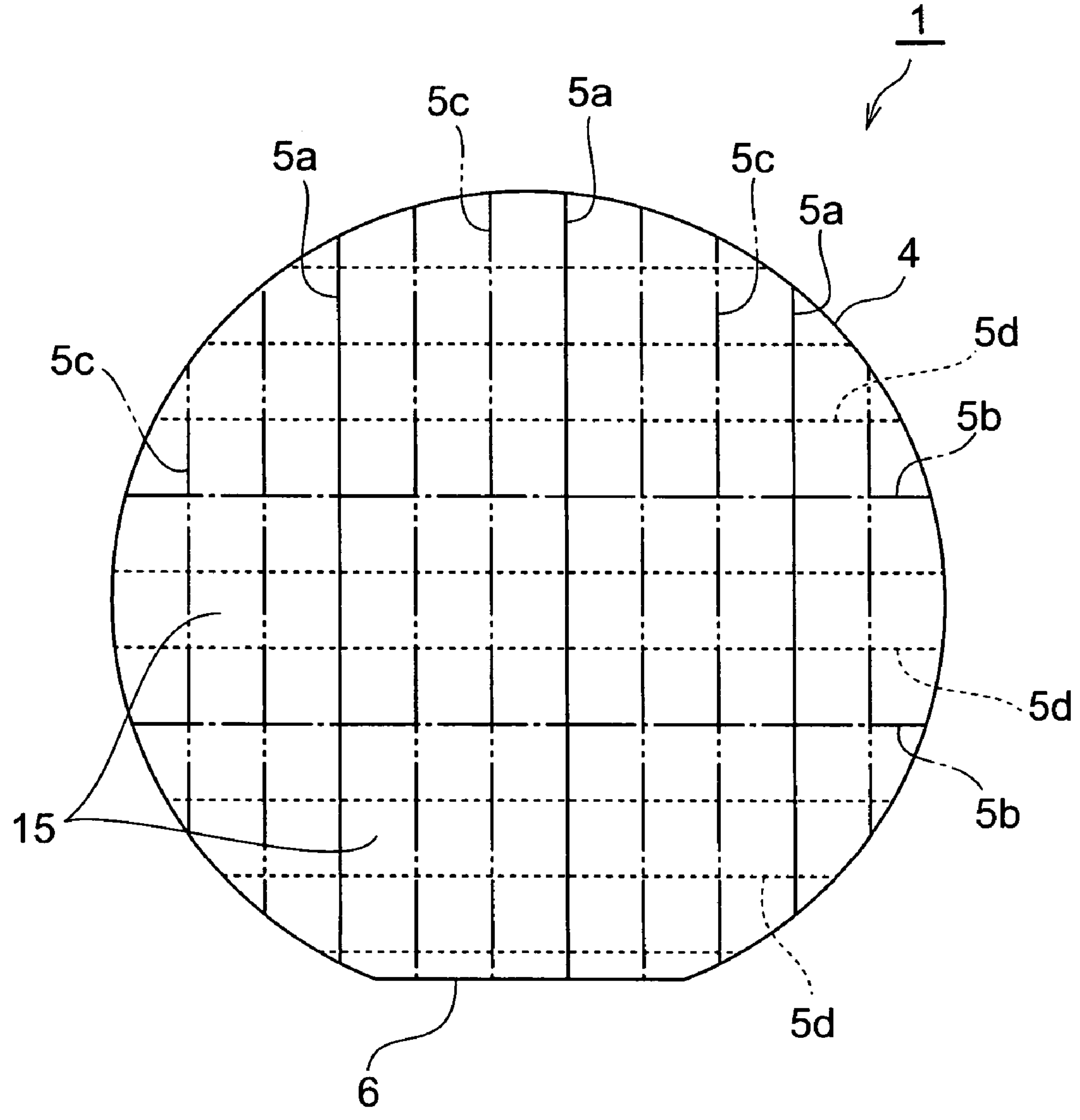
Figure 29:
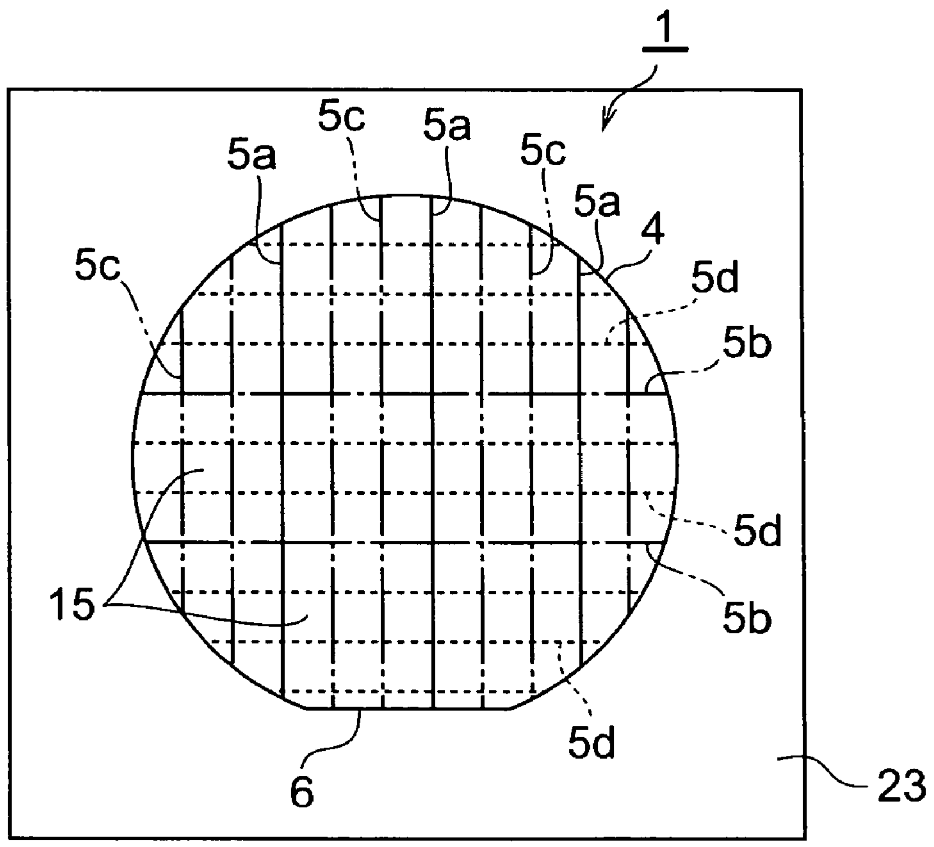
Figure 30:
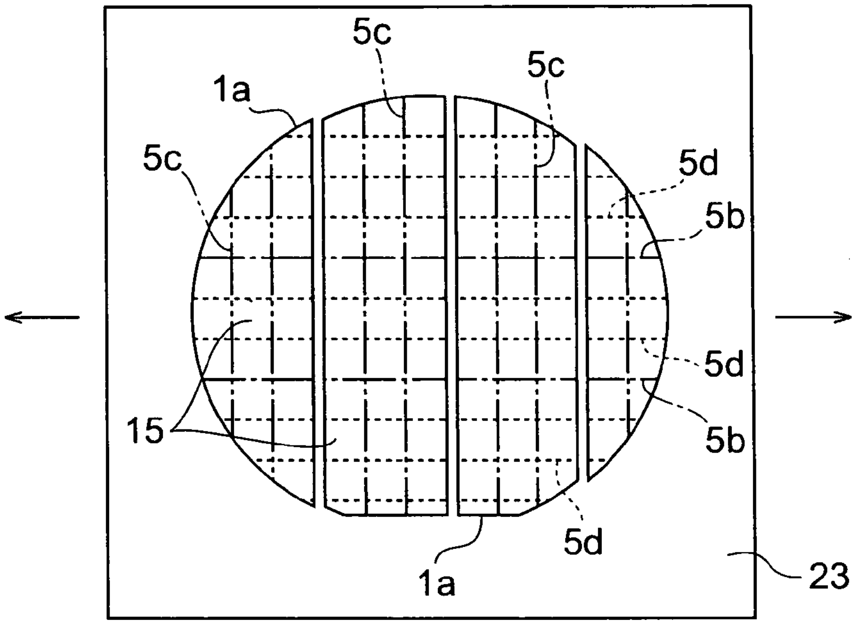
Figure 30:
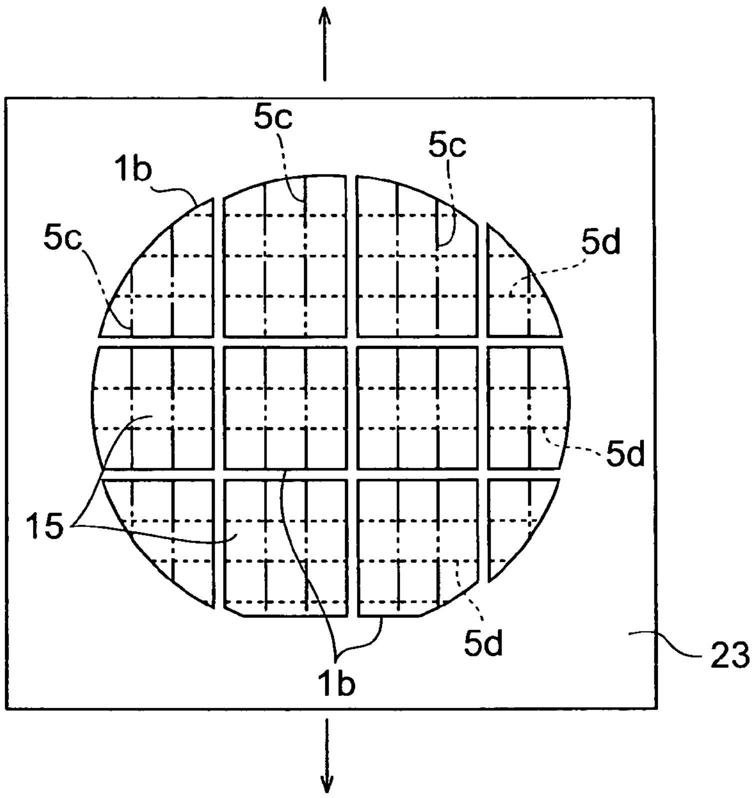
Figure 31:
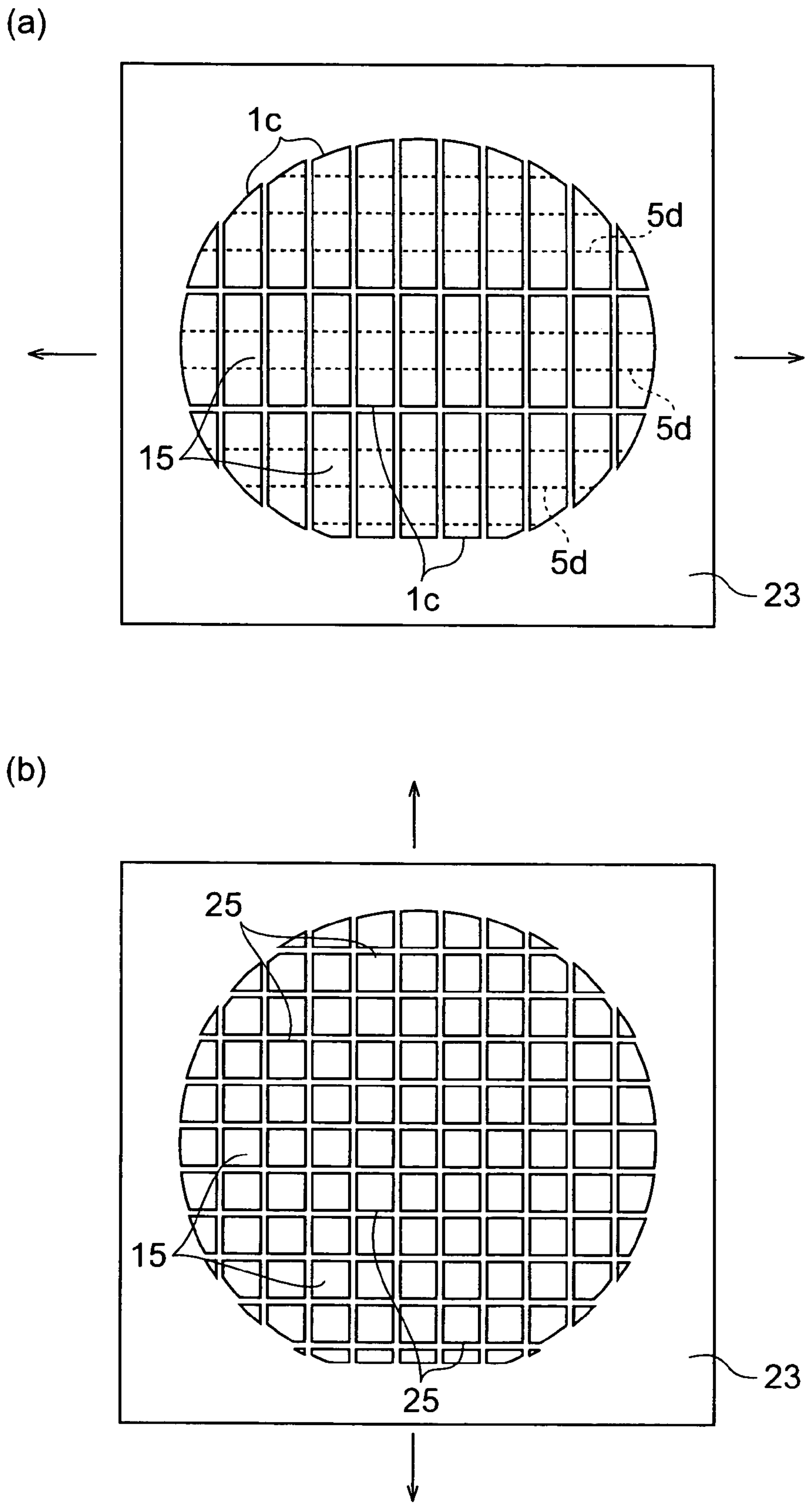
Figure 32:
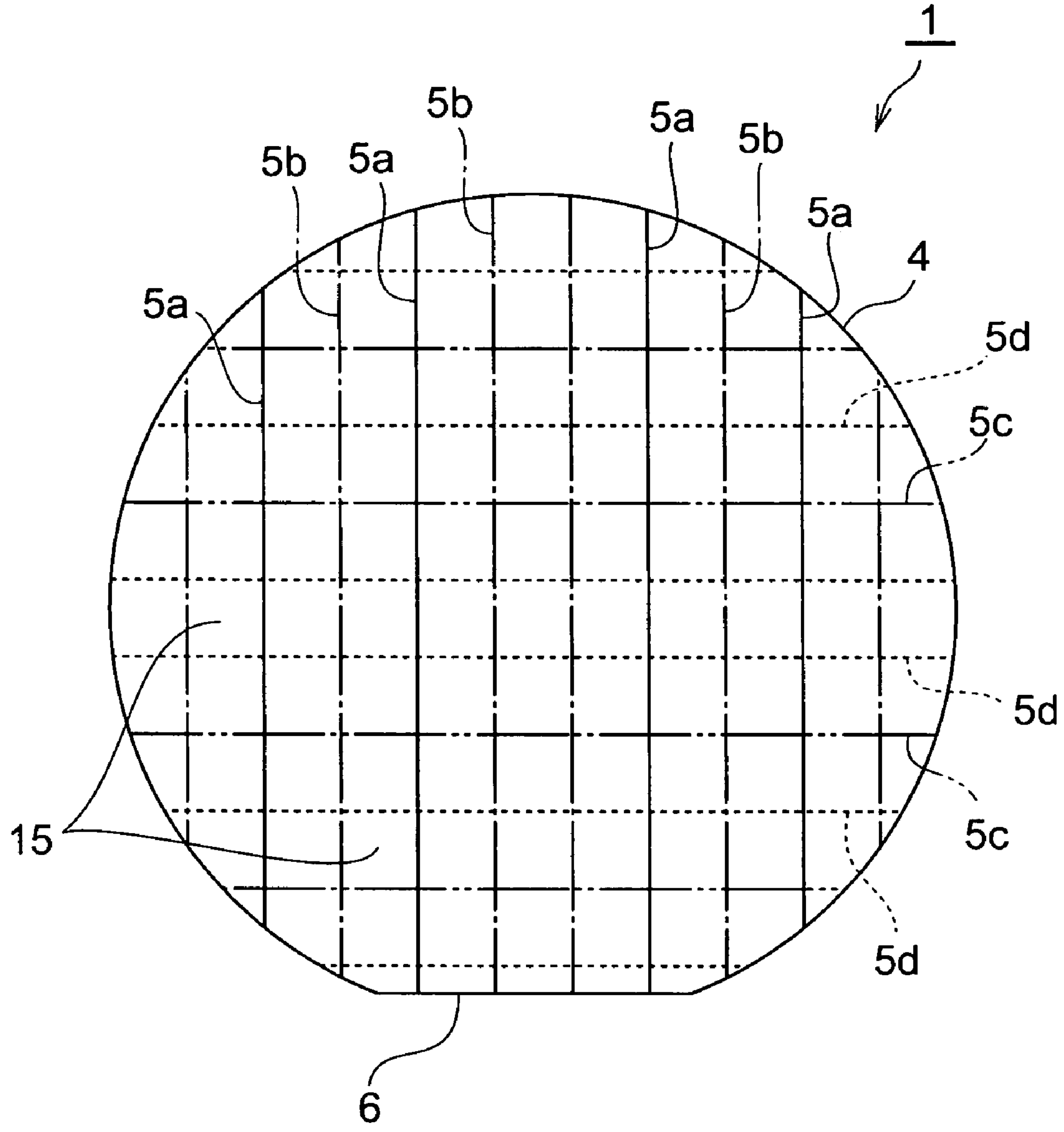
Figure 33:
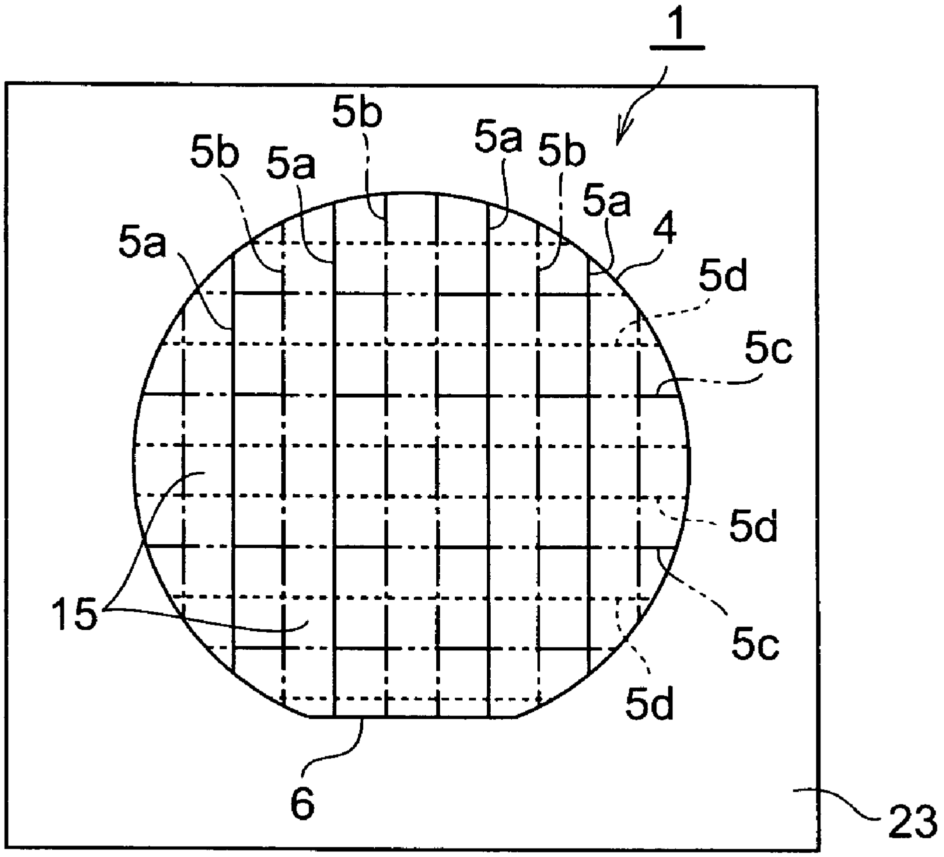
Figure 34:
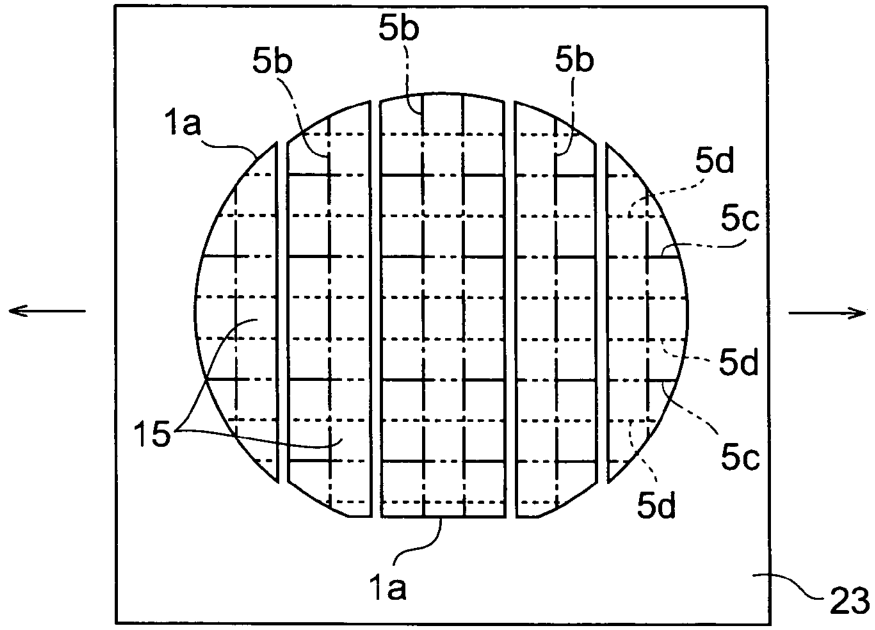
Figure 34:
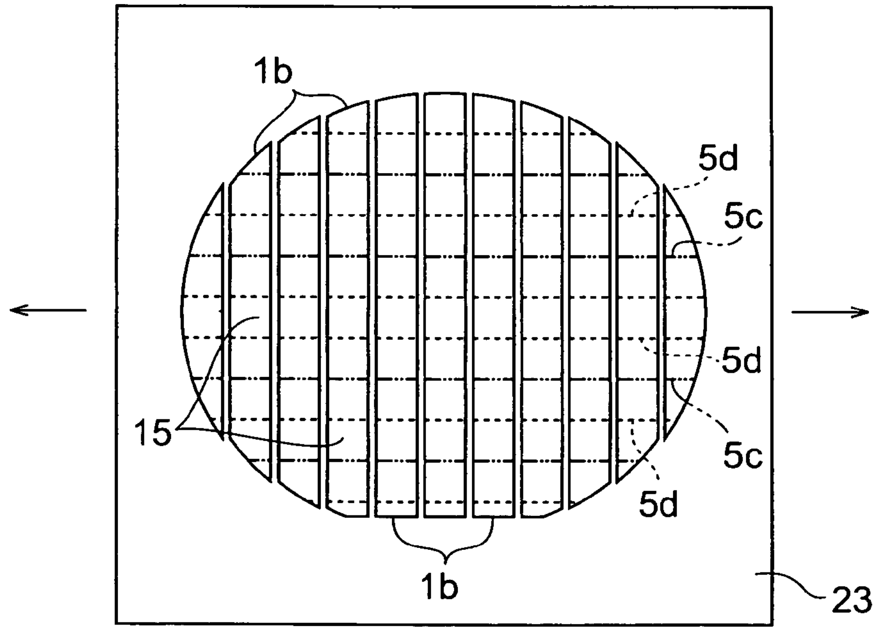
Figure 35:
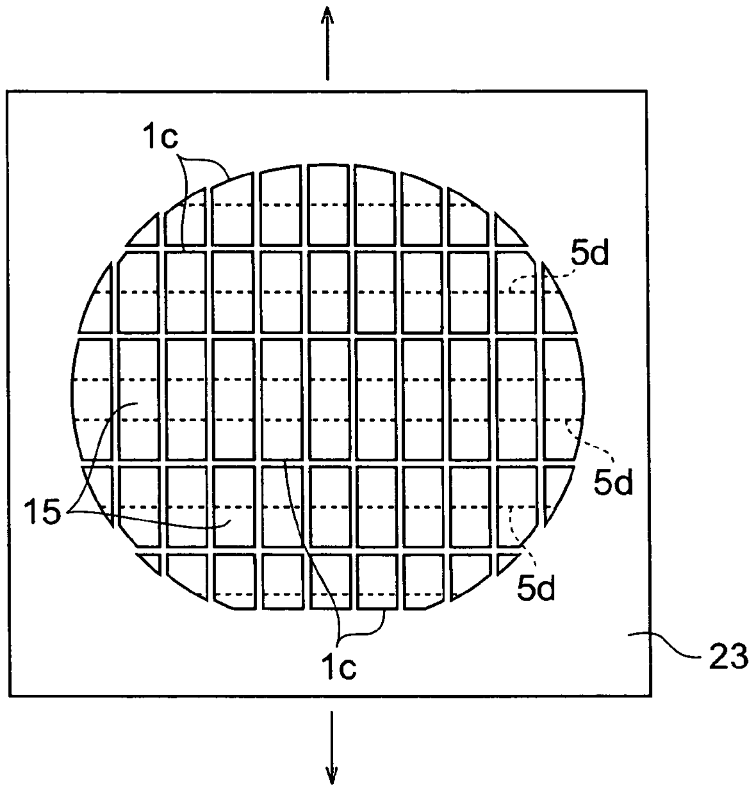
Figure 35:
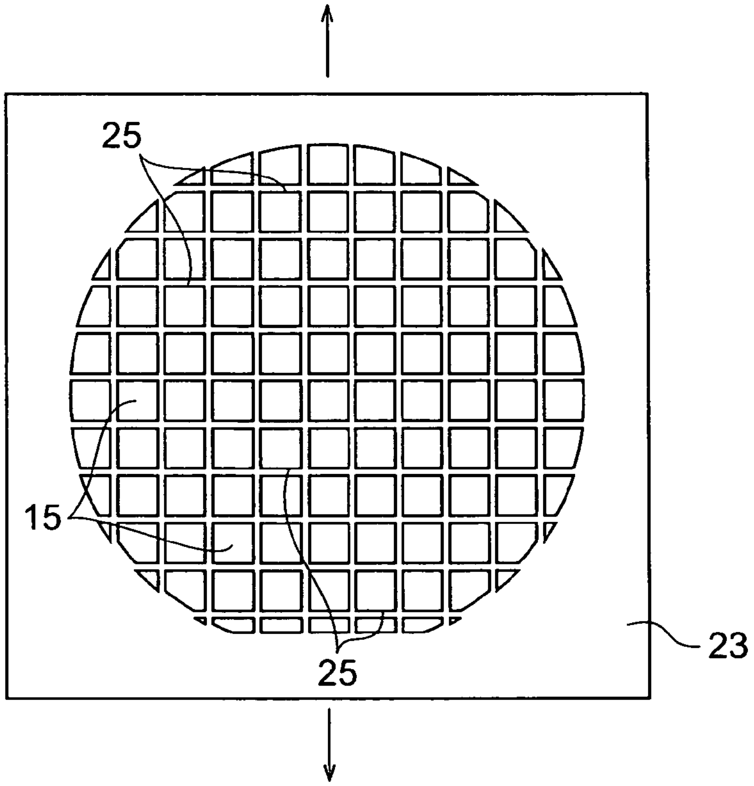
Figure 36:
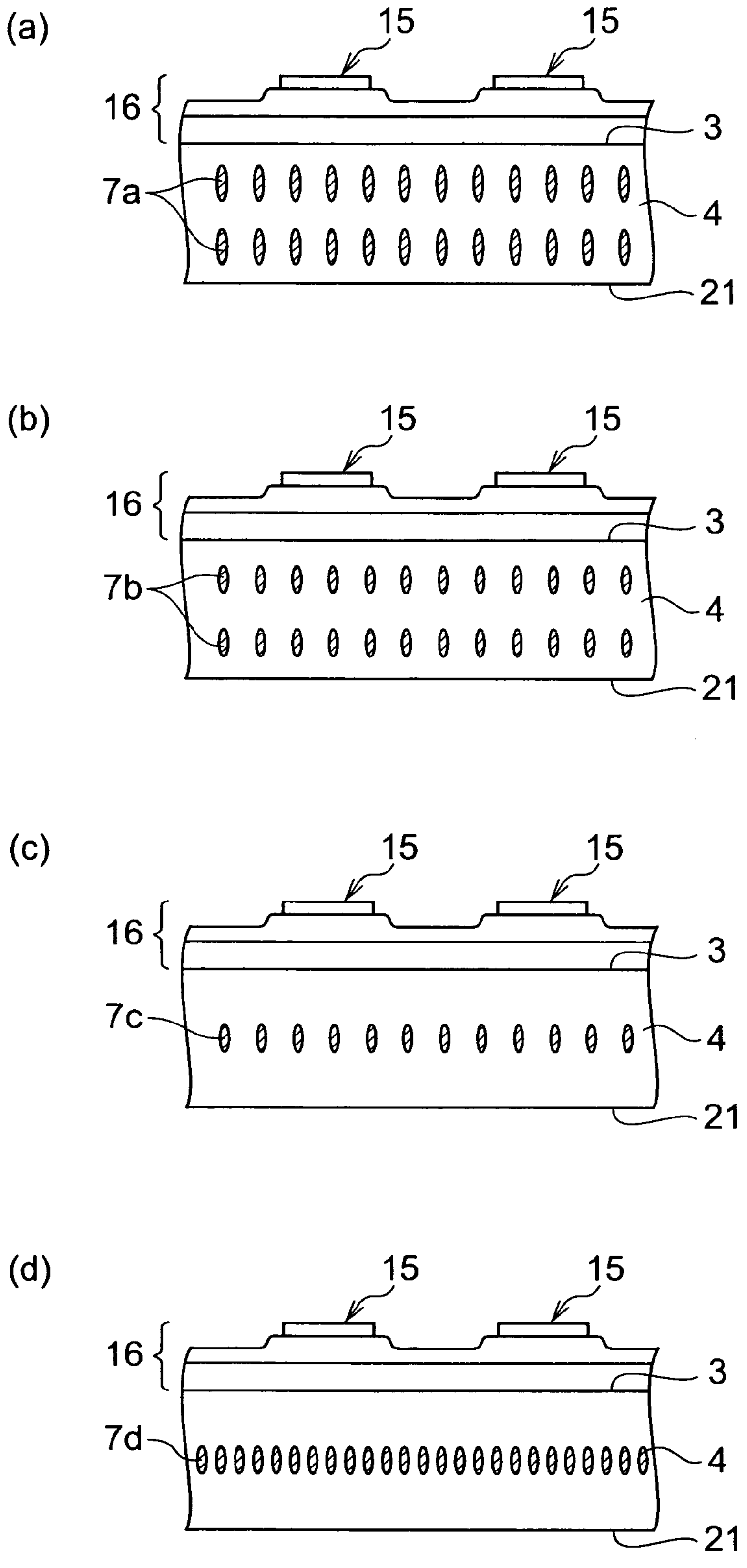
Figure 37:
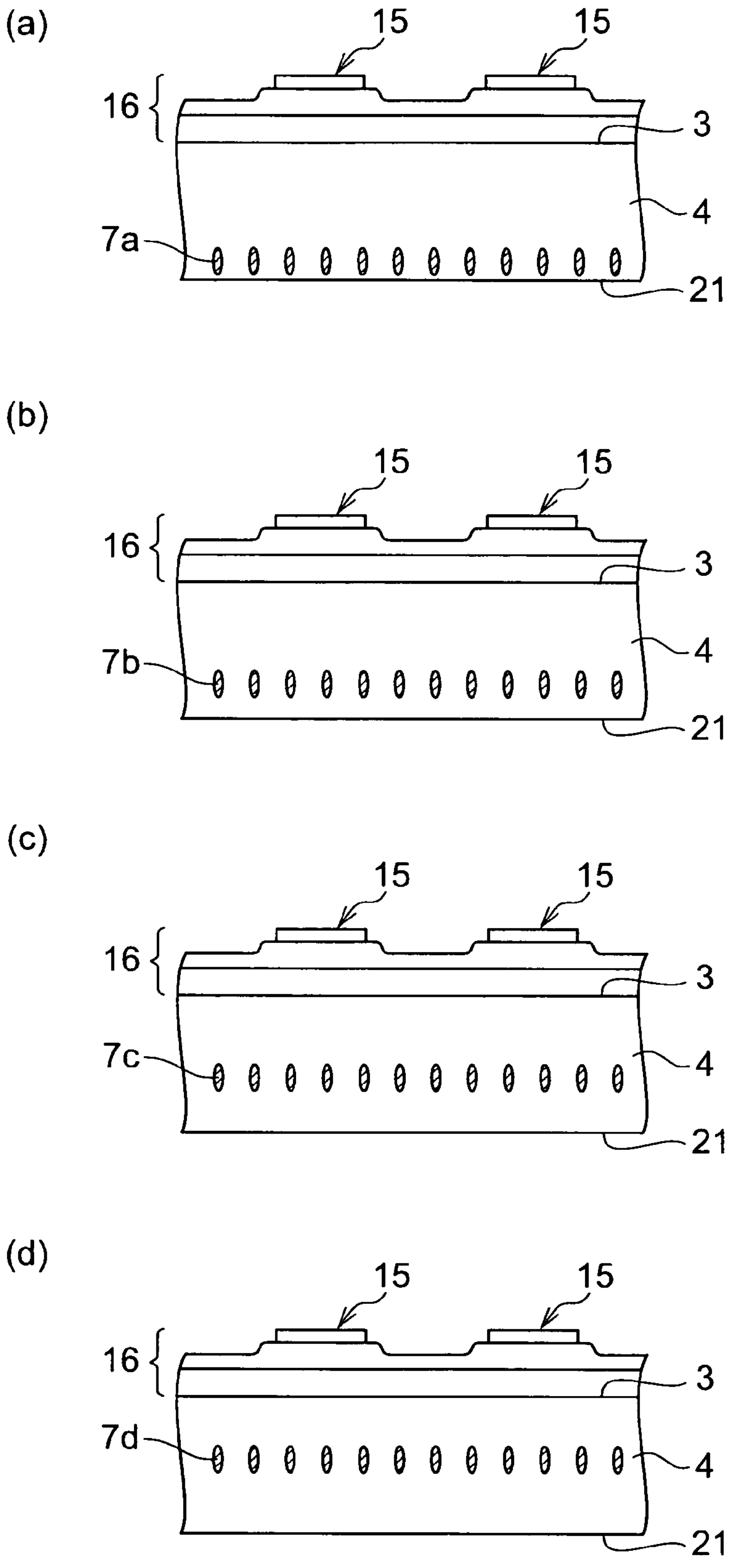

and (b) show respective states where a protective tape is bonded to the object, and the object is irradiated with laser light;

FIG. 17 is a view for explaining the laser processing method in accordance with the first embodiment, in which (a) and (b) show respective states where an expandable tape is bonded to the object, and the protective tape is irradiated with UV rays;

FIG. 18 is a view for explaining the laser processing method in accordance with the first embodiment, in which (a) and (b) show respective states where the protective tape is peeled off from the object, and the expandable tape is expanded;

FIG. 19 is a sectional view showing a state where modified regions are formed in conformity to lines to cut;

FIG. 20 is a first plan view for explaining a step of expanding the expandable tape in the laser processing method in accordance with the first embodiment;

FIG. 21 is a second plan view for explaining the step of expanding the expandable tape in the laser processing method in accordance with the first embodiment;

FIG. 22 is a third plan view for explaining the step of expanding the expandable tape in the laser processing method in accordance with the first embodiment;

FIG. 23 is a view showing photographs of cut states of the object, in which (a) and (b) illustrate respective cases where the object is not cut stepwise into a plurality of semiconductor chips, and the object is cut stepwise into a plurality of semiconductor chips;

FIG. 24 is a view showing photographs of cut states of semiconductor chips, in which (a) and (b) illustrate respective cases where the object is not cut stepwise into a plurality of semiconductor chips, and the object is cut stepwise into a plurality of semiconductor chips;

FIG. 25 is a plan view of the object to be processed in the laser processing method in accordance with a second embodiment;

FIG. 26 is a first plan view for explaining a step of expanding an expandable tape in the laser processing method in accordance with a second embodiment;

FIG. 27 is a second plan view for explaining the step of expanding the expandable tape in the laser processing method in accordance with the second embodiment;

FIG. 28 is a plan view of the object to be processed in the laser processing method in accordance with a third embodiment;

FIG. 29 is a first plan view for explaining a step of expanding an expandable tape in the laser processing method in accordance with the third embodiment;

FIG. 30 is a second plan view for explaining the step of expanding the expandable tape in the laser processing method in accordance with the third embodiment;

FIG. 31 is a third plan view for explaining the step of expanding the expandable tape in the laser processing method in accordance with the third embodiment;

FIG. 32 is a plan view of the object to be processed in the laser processing method in accordance with a fourth embodiment;

FIG. 33 is a first plan view for explaining a step of expanding an expandable tape in the laser processing method in accordance with the fourth embodiment;

FIG. 34 is a second plan view for explaining the step of expanding the expandable tape in the laser processing method in accordance with the fourth embodiment;

FIG. 35 is a third plan view for explaining the step of expanding the expandable tape in the laser processing method in accordance with the fourth embodiment;

FIG. 36 is a sectional view showing a state where modified regions are formed in conformity to lines to cut in a first modified example of the laser processing method in accordance with the first embodiment;

FIG. 37 is a sectional view showing a state where modified regions are formed in conformity to lines to cut in a second modified example of the laser processing method in accordance with the first embodiment;

FIG. 38 is a first table listing modified region forming conditions for changing the easiness to cause a substrate to fracture depending on lines to cut; and FIG. 39 is a second table listing modified region forming conditions for changing the easiness to cause the substrate to fracture depending on lines to cut.

EXPLANATIONS OF NUMERALS

1 . . . object to be processed; 1*a*, 1*b*, 1*c* . . . block; 3 . . . surface; 4 . . . substrate; 5, 5*a*, 5*b*, 5*c*, 5*d* . . . line to cut; 7*a*, 7*b*, 7*c*, 7*d* . . . modified region; 8 . . . starting point region for cutting; 13 . . . molten processed region; 15 . . . functional device; 16 . . . laminate part; 21 . . . rear face; 23 . . . expandable tape (expandable film); 25 . . . semiconductor chip; L . . . laser light; P . . . light-converging point.

Best Modes for Carrying Out the Invention

In the following, preferred embodiments of the method of cutting an object to be processed in accordance with the present invention will be explained in detail with reference to the drawings. In these embodiments, a phenomenon known as multiphoton absorption is used for forming a modified region within the object to be processed. Therefore, to begin with, a laser processing method for forming a modified region by the multiphoton absorption will be explained.

A material becomes transparent when its absorption bandgap $E_G$ is greater than photon energy hμ. Hence, a condition under which absorption occurs in the material is $h\mu > E_G$. However, even when optically transparent, the material generates absorption under a condition of $nh\mu > E_G$ (where n=2, 3, 4, . . . ) if the intensity of laser light becomes very high. This phenomenon is known as multiphoton absorption. In the case of pulsed waves, the intensity of laser light is determined by the peak power density ($W/cm^2$) of laser light at a light-converging point. The multiphoton absorption occurs under a condition where the peak power density is $1\times10^8$ ($w/cm^2$) or greater, for example. The peak power density is determined by (energy of laser light at the light-converging point per pulse)/(beam spot cross-sectional area of laser light×pulse width). In the case of continuous waves, the intensity of laser light is determined by the field intensity ($W/cm^2$) of laser light at the light-converging point.

Figure 1:
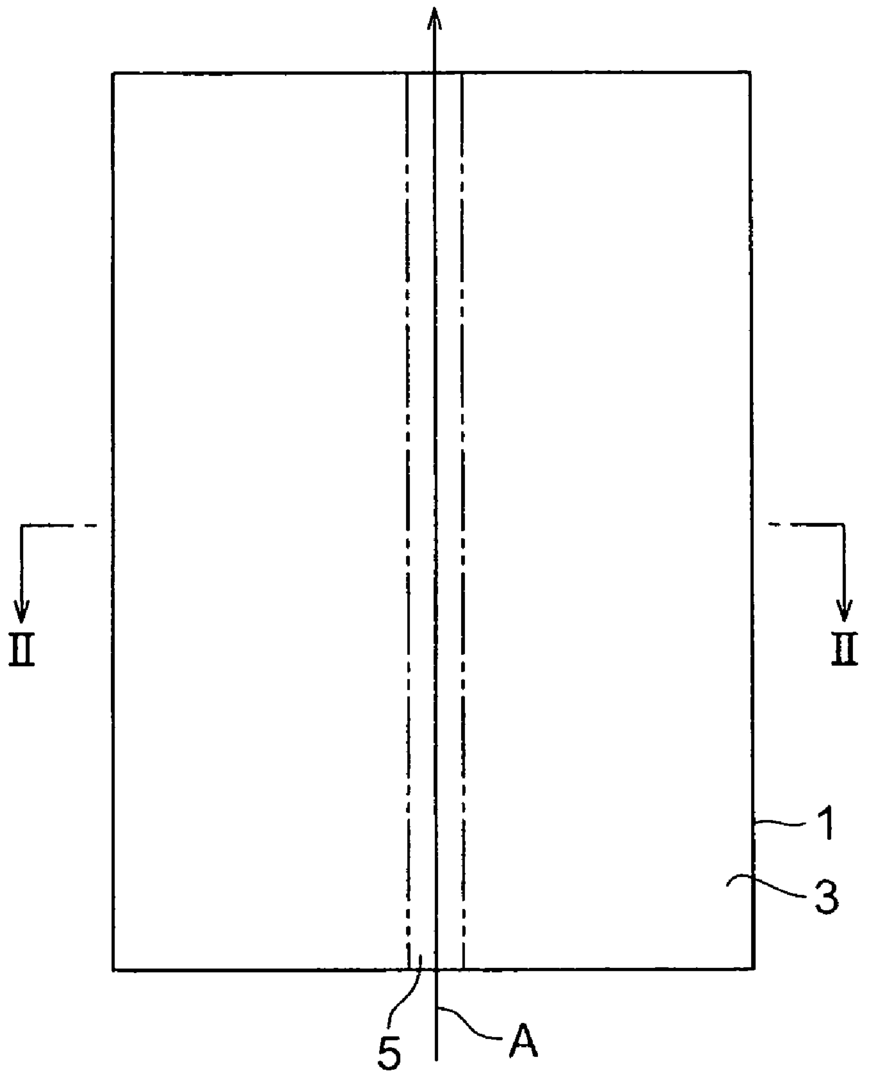
FIG. 1 is a plan view of an object to be processed during laser processing by the laser processing method in accordance with an embodiment.
Figure 2:
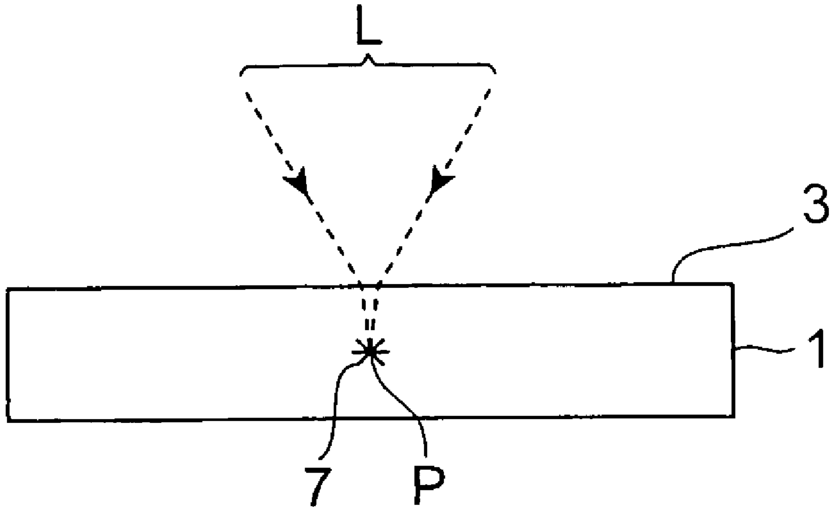
FIG. 2 is a sectional view of the object taken along the line II-II of FIG. 1.

The principle of the laser processing method in accordance with an embodiment using such multiphoton absorption will be explained with reference to FIGS. 1 to 6. As shown in FIG. 1, on a front face 3 of a wafer-like (planar) object to be processed 1, a line to cut 5 for cutting the object 1 exists. The line to cut 5 is a virtual line extending straight. As shown in FIG. 2, the laser processing method in accordance with this embodiment irradiates the object 1 with laser light L while locating a light-converging point P therewithin under a condition generating multiphoton absorption, so as to form a modified region 7. The light-converging point P is a position at which the laser light L is converged. The line to cut 5 may be curved instead of being straight, and may be a line actually drawn on the object 1 without being restricted to the virtual line.

Figure 3:
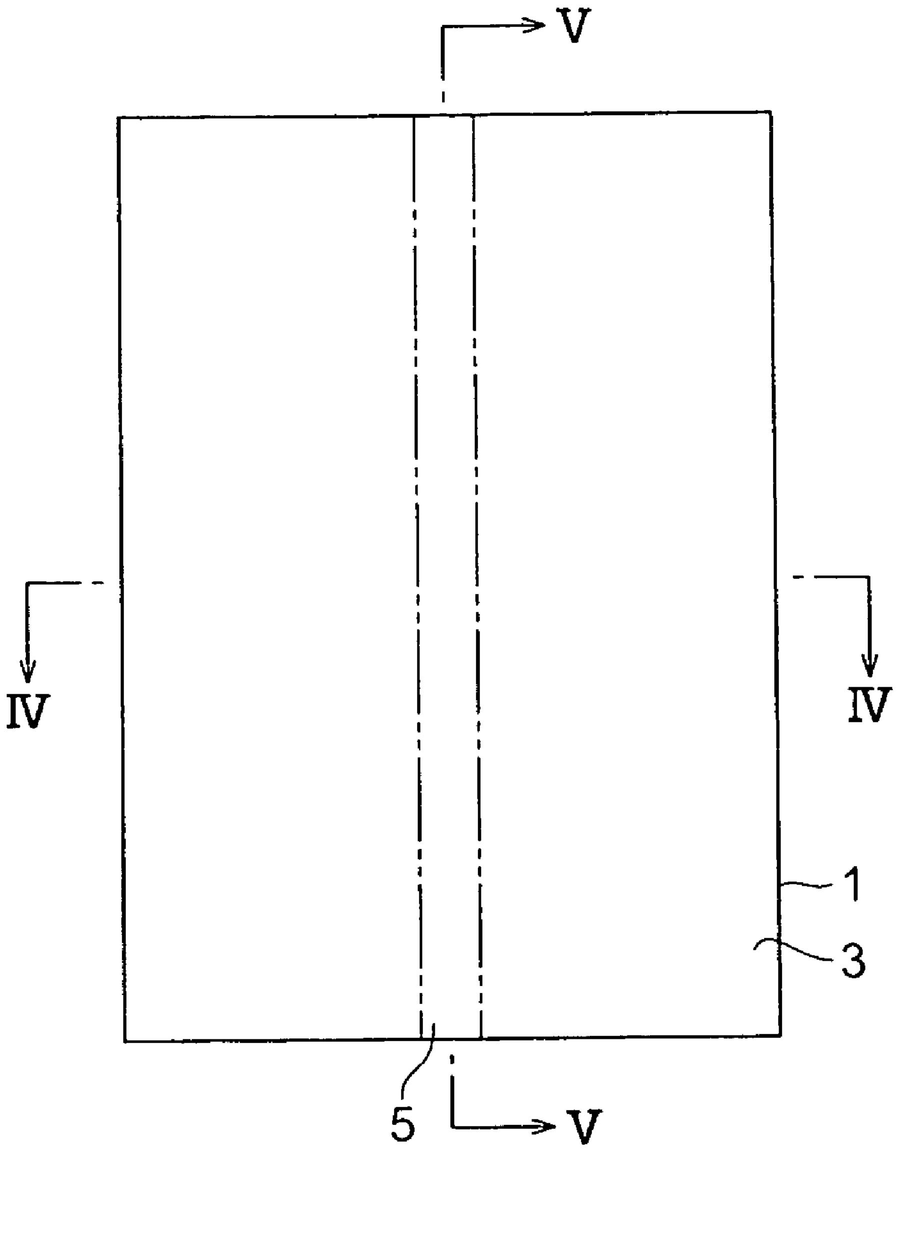
FIG. 3 is a plan view of the object after laser processing in the laser processing method in accordance with the embodiment.
Figure 4:
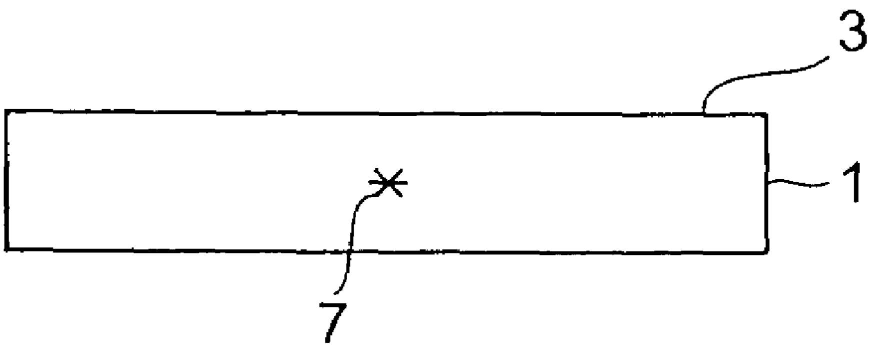
FIG. 4 is a sectional view of the object taken along the line IV-IV of FIG. 3.
Figure 5:
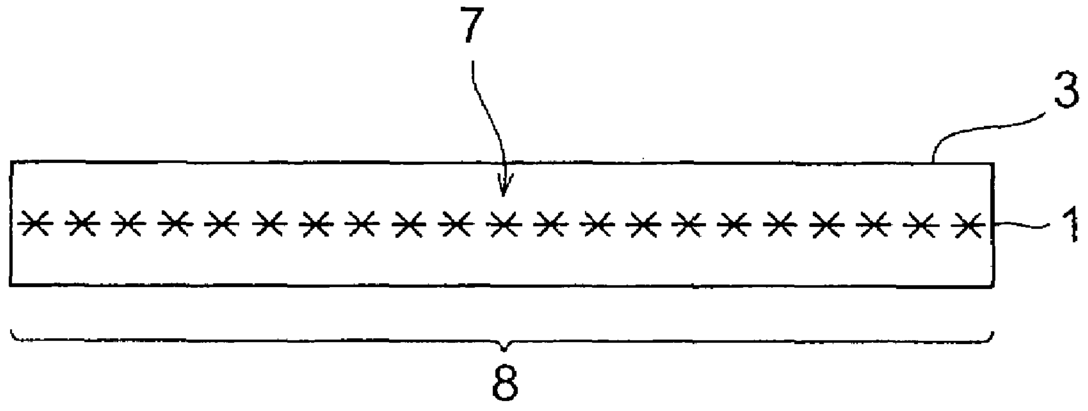
FIG. 5 is a sectional view of the object taken along the line V-V of FIG. 3.

Then, the laser light L is relatively moved along the line to cut 5 (i.e., in the direction of arrow A in FIG. 1), so as to shift the light-converging point P along the line to cut 5. Consequently, as shown in FIGS. 3 to 5, the modified region 7 is formed along the line to cut 5 within the object 1, and becomes a starting point region for cutting 8. The starting point region for cutting 8 refers to a region which becomes a start point for cutting when the object 1 is cut. The starting point region for cutting 8 may be made by forming the modified region 7 either continuously or intermittently.

In the laser processing method in accordance with this embodiment, the modified region 7 is not formed by the heat generated from the object 1 absorbing the laser light L. The laser light L is transmitted through the object 1, so as to generate multiphoton absorption therewithin, thereby forming the modified region 7. Therefore, the front face 3 of the object 1 hardly absorbs the laser light L and does not melt.

Figure 6:
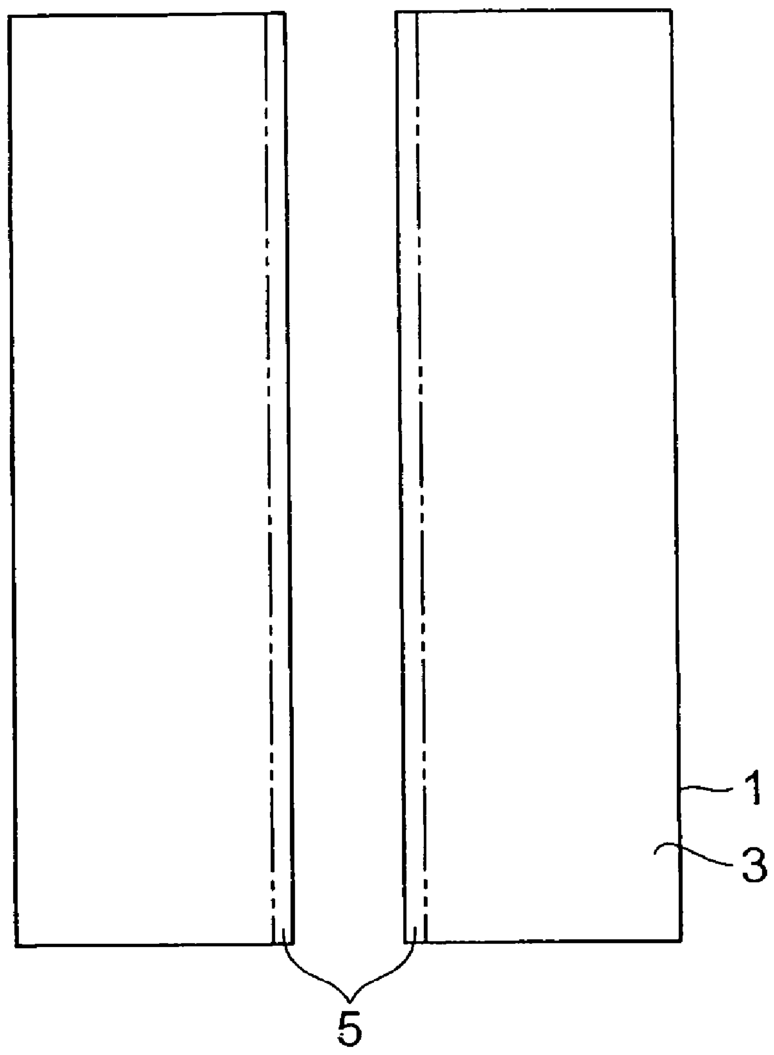
FIG. 6 is a plan view of the object cut by the laser processing method in accordance with the embodiment.

Forming the starting point region for cutting 8 within the object 1 makes it easier to generate fractures from the starting point region for cutting 8 acting as a start point, whereby the object 1 can be cut with a relatively small force as shown in FIG. 6. Therefore, the object 1 can be cut with a high precision without generating unnecessary fractures on the front face 3 of the object 1.

There seem to be the following two ways of cutting the object 1 from the starting point region for cutting 8 acting as a start point. The first case is where an artificial force is applied to the object 1 after the starting point region for cutting 8 is formed, so that the object 1 fractures from the starting point region for cutting 8 acting as a start point, whereby the object 1 is cut. This is the cutting in the case where the object has a large thickness, for example. Applying an artificial force refers to exerting a bending stress or shear stress to the object 1 along the starting point region for cutting 8, or generating a thermal stress by applying a temperature difference to the object 1, for example. The other case is where the forming of the starting point region for cutting 8 causes the object 1 to fracture naturally in its cross-sectional direction (thickness direction) from the starting point region for cutting 8 acting as a start point, thereby cutting the object 1. This becomes possible if the starting point region for cutting 8 is formed by one row of the modified region 7 when the object 1 has a small thickness, or if the starting point region for cutting 8 is formed by a plurality of rows of the modified region 7 in the thickness direction when the object 1 has a large thickness. Even in this naturally fracturing case, fractures do not extend onto the front face 3 at a portion corresponding to an area not formed with the starting point region for cutting 8 in the part to cut, so that only the portion corresponding to the area formed with the starting point region for cutting 8 can be cleaved, whereby cleavage can be controlled well. Such a cleaving method with a favorable controllability is quite effective, since the object 1 to be processed such as silicon wafer has recently been apt to decrease its thickness.

The modified region formed by multiphoton absorption in the laser processing method in accordance with this embodiment encompasses the following cases (1) to (3):

(1) Case where the modified region is a crack region including one crack or a plurality of cracks An object to be processed (e.g., glass or a piezoelectric material made of $LiTaO_3$) is irradiated with laser light while locating a light-converging point therewithin under a condition with a field intensity of at least $1\times10^8$ (W/cm$^2$) at the light-converging point and a pulse width of 1 μs or less. This magnitude of pulse width is a condition under which a crack region can be formed only within the object while generating multiphoton absorption without causing unnecessary damages on the front face of the object. This generates a phenomenon of optical damage by multiphoton absorption within the object. This optical damage induces a thermal distortion within the object, thereby forming a crack region therewithin. The upper limit of field intensity is $1\times10^{12}$ (W/cm$^2$), for example. The pulse width is preferably 1 to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex™ glass (with a thickness of 700 μm)

(B) Laser light source: semiconductor laser pumping Nd:YAG laser wavelength: 1064 nm laser light spot cross-sectional area: $3.14\times10^{-8}$ cm$^2$ oscillation mode: Q-switched pulse repetition frequency: 100 kHz pulse width: 30 ns output: output<1 mJ/pulse laser light quality: $TEM_{00}$ polarizing property: linear polarization (C) Condenser lens transmittance at a laser light wavelength: 60%

(D) Moving rate of the mounting table mounting the object: 100 mm/sec

The laser light quality of $TEM_{00}$ means that the light-converging characteristic is so high that convergence to about the wavelength of laser light is possible.

Figure 7:
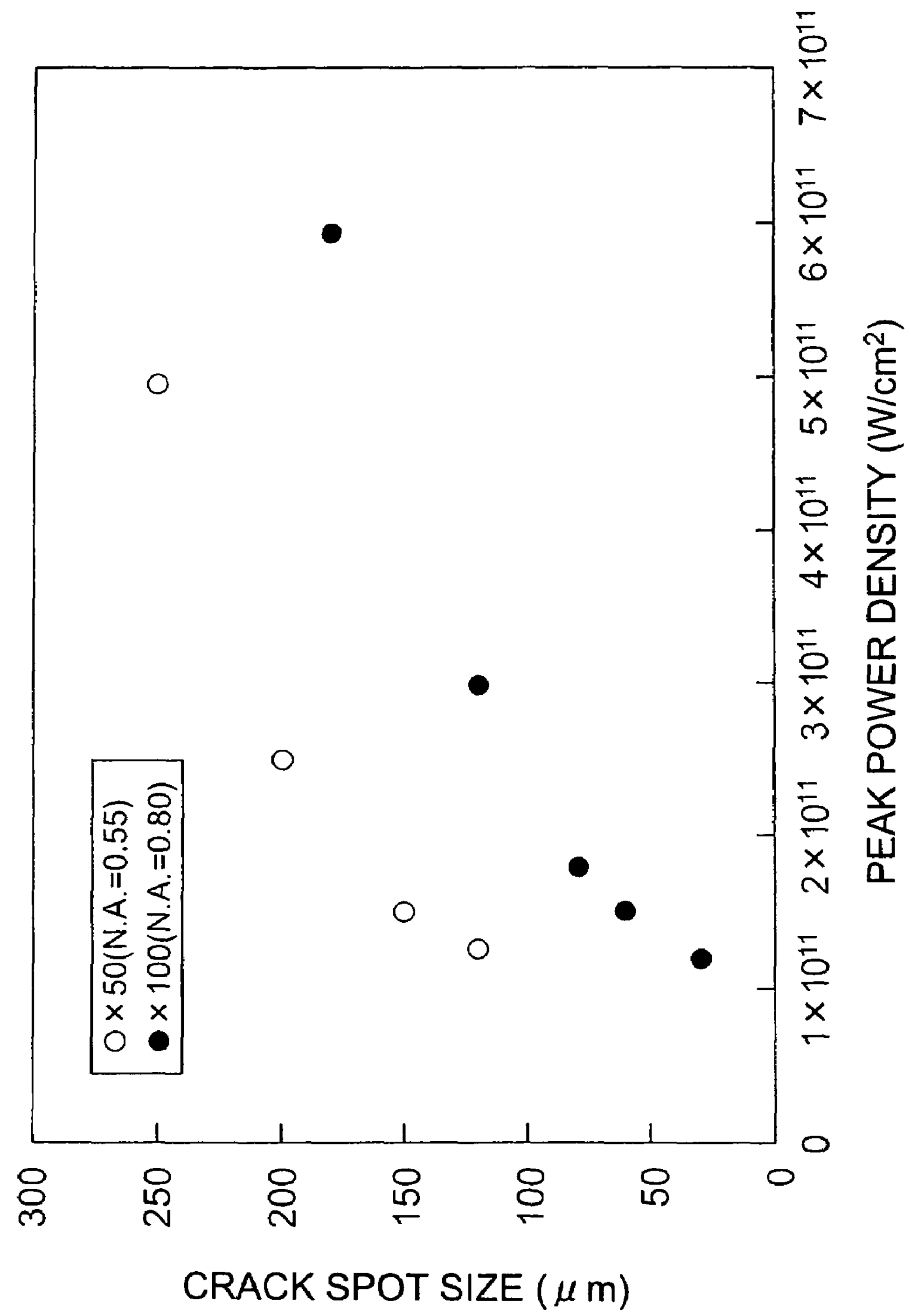
FIG. 7 is a graph showing relationships between the field intensity and crack spot size in the laser processing method in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
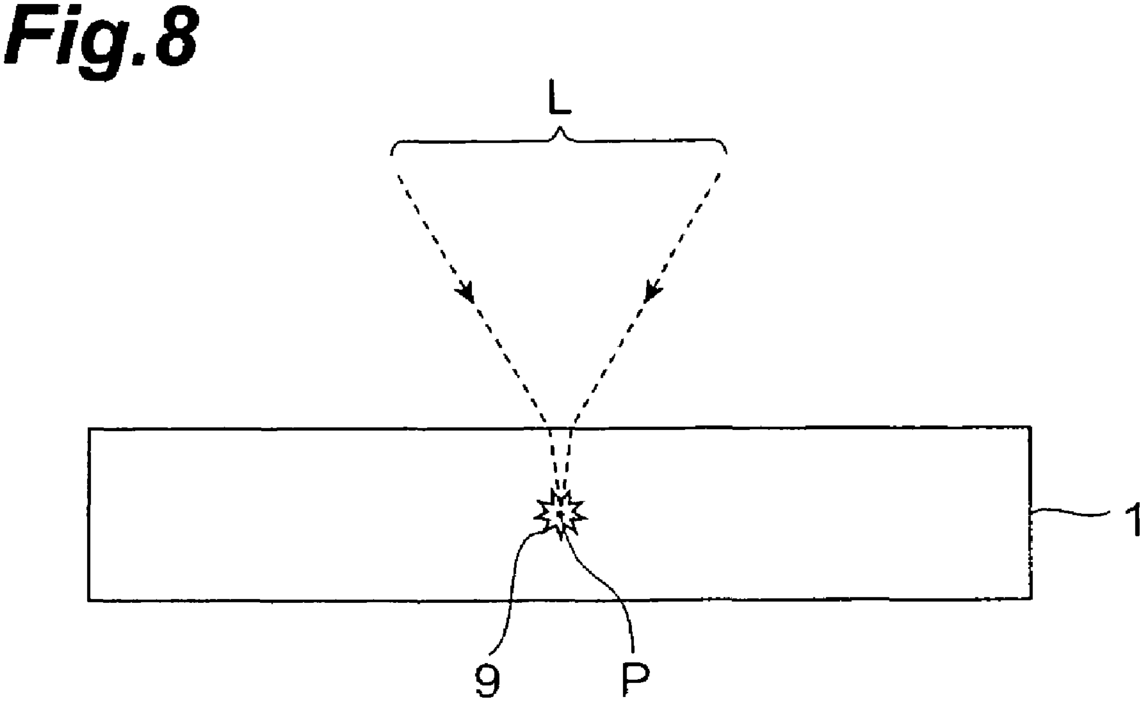
FIG. 8 is a sectional view of the object in the first step of the laser processing method. in accordance with the embodiment.
Figure 9:
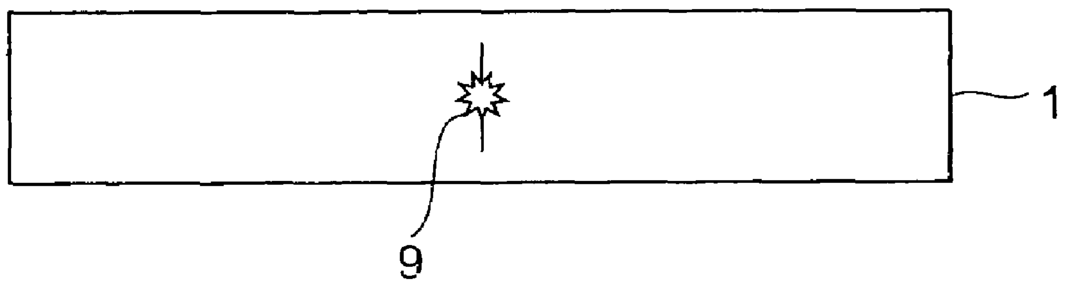
FIG. 9 is a sectional view of the object in the second step of the laser processing method in accordance with the embodiment.
Figure 10:
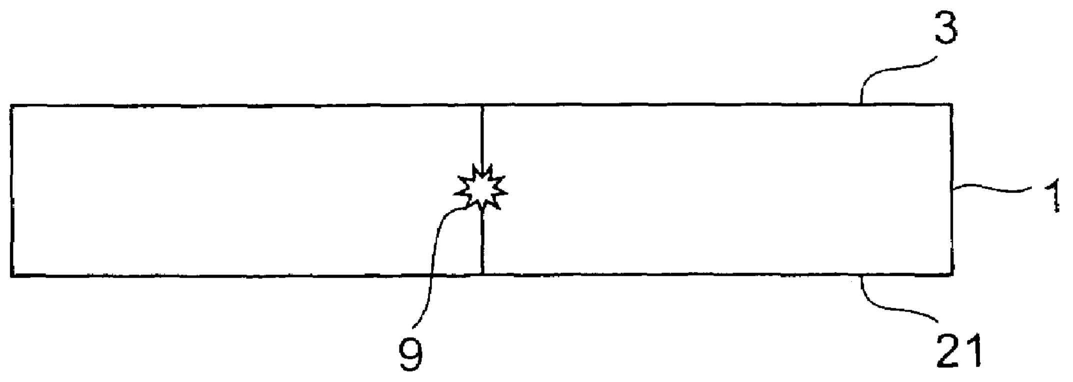
FIG. 10 is a sectional view of the object in the third step of the laser processing method in accordance with the embodiment.
Figure 11:
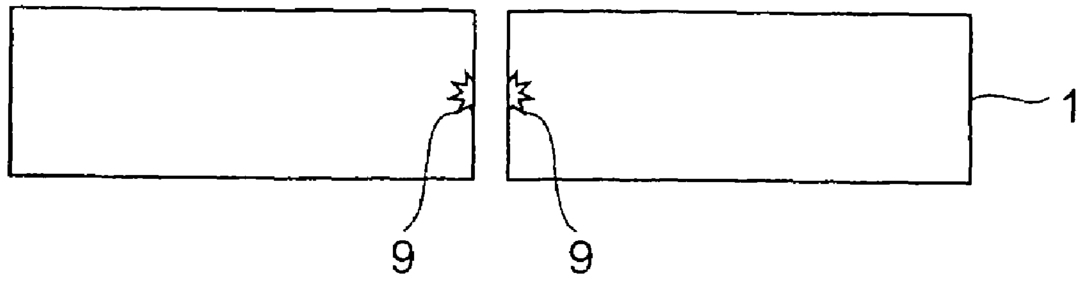
FIG. 11 is a sectional view of the object in the fourth step of the laser processing method in accordance with the embodiment.

A mechanism by which the objet to be processed is cut by forming a crack region will now be explained with reference to FIGS. 8 to 11. As shown in FIG. 8, the object 1 is irradiated with laser light L while the light-converging point P is located within the object 1 under a condition where multiphoton absorption occurs, so as to form a crack region 9 therewithin along a line to cut. The crack region 9 is a region containing one crack or a plurality of cracks. Thus formed crack region 9 becomes a starting point region for cutting. As shown in FIG. 9, a crack further grows from the crack region 9 acting as a start point (i.e., from the starting point region for cutting acting as a start point), and reaches the front face 3 and rear face 21 of the object 1 as shown in FIG. 10, whereby the object 1 fractures and is consequently cut as shown in FIG. 11. The crack reaching the front face 3 and rear face 21 of the object 1 may grow naturally or as a force is applied to the object 1.

(2) Case where the modified region is a molten processed region

An object to be processed (e.g., semiconductor material such as silicon) is irradiated with laser light while locating a light-converging point within the object under a condition with a field intensity of at least $1\times10^8$ (W/cm$^2$) at the light-converging point and a pulse width of 1 μs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1\times10^{12}$ (W/cm$^2$), for example. The pulse width is preferably 1 to 200 ns, for example.

By an experiment, the inventors verified that a molten processed region was formed within a silicon wafer. The following are conditions of the experiment.

(A) Object to be processed: silicon wafer (with a thickness of 350 μm and an outer diameter of 4 inches)

(B) Laser light source: semiconductor laser pumping Nd:YAG laser wavelength: 1064 nm laser light spot cross-sectional area: $3.14\times10^{-8}$ cm$^2$ oscillation mode: Q-switched pulse repetition frequency: 100 kHz pulse width: 30 ns output: 20 μJ/pulse laser light quality: $TEM_{00}$ polarizing property: linear polarization (C) Condenser lens magnification: ×50

N.A.: 0.55 transmittance at a laser light wavelength: 60%

(D) Moving rate of the mounting table mounting the object: 100 mm/sec

Figure 12:
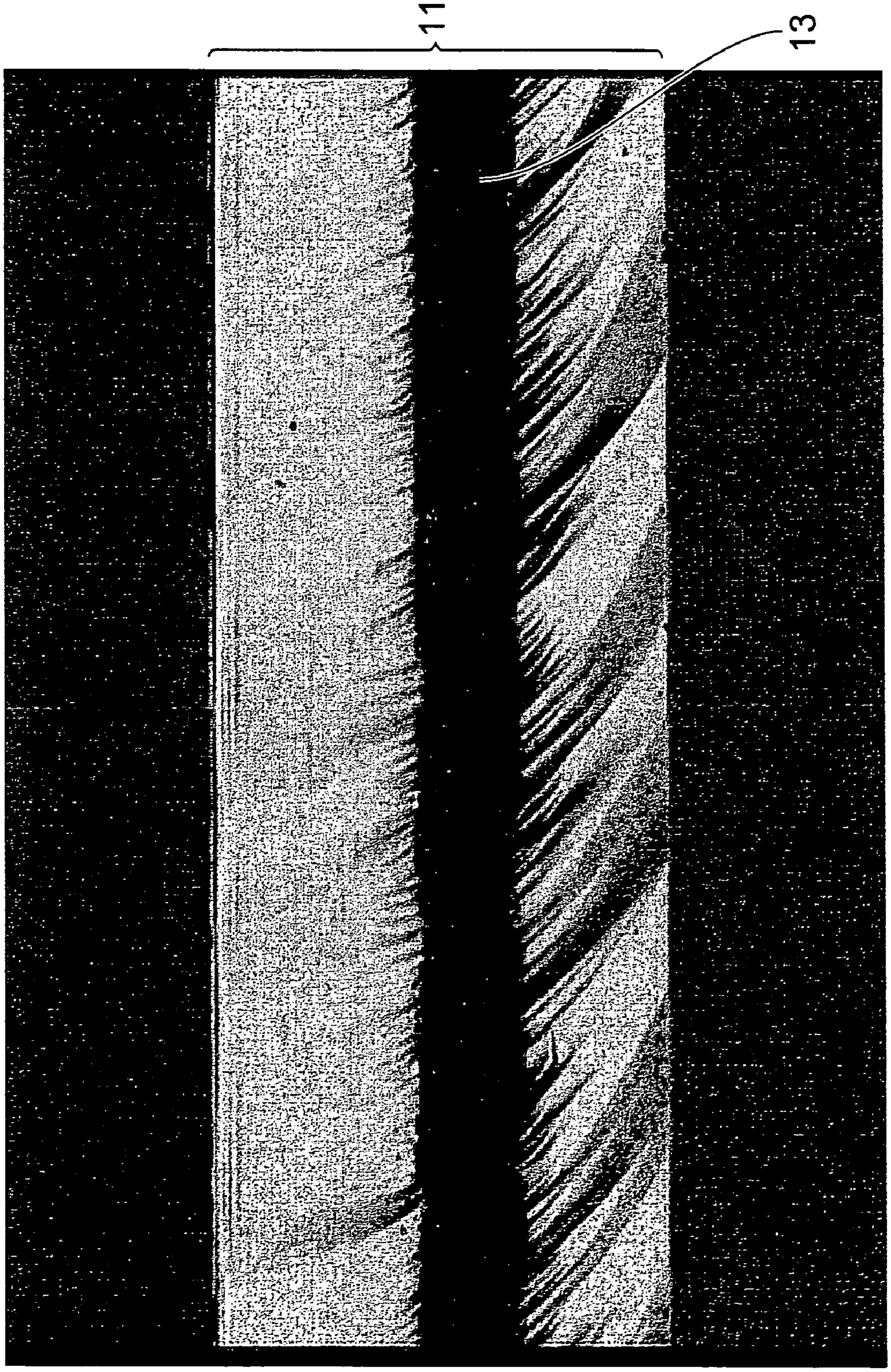
FIG. 12 is a view showing a photograph of a cross section of a part of a silicon wafer cut by the laser processing method in accordance with the embodiment.

FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 μm in the thickness direction.

Figure 13:
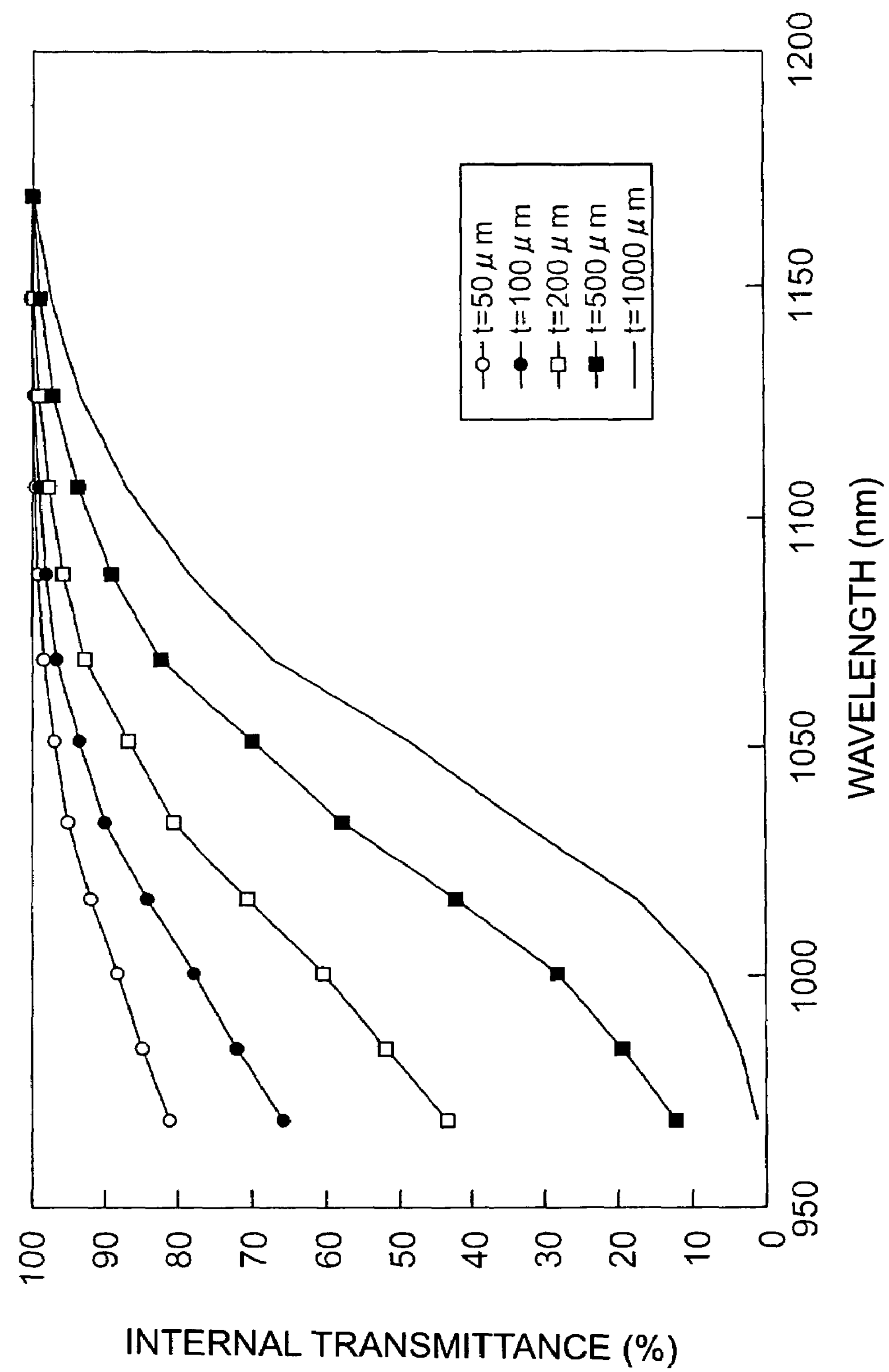
FIG. 13 is a graph showing relationships between the laser light wavelength and the transmittance within the silicon substrate in the laser processing method in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 μm, 100 μm, 200 μm, 500 μm, and 1000 μm.

For example, at the Nd:YAG laser wavelength of 1064 nm, the laser light appears to be transmitted through the silicon substrate by at least 80% when the silicon substrate has a thickness of 500 μm or less. Since the silicon wafer 11 shown in FIG. 12 has a thickness of 350 μm, the molten processed region 13 caused by multiphoton absorption is formed near the center of the silicon wafer 11, i.e., at a part distanced from the front face by 175 μm. The transmittance in this case is 90% or more with reference to a silicon wafer having a thickness of 200 μm, whereby the laser light is absorbed only slightly within the silicon wafer 11 but is substantially transmitted therethrough. This means that the molten processed region 13 is formed within the silicon wafer 11 not by laser light absorption within the silicon wafer 11 (i.e., not by usual heating with the laser light) but by multiphoton absorption. The forming of a molten processed region by multiphoton absorption is disclosed, for example, in "Silicon Processing Characteristic Evaluation by Picosecond Pulse Laser", Preprints of the National Meetings of Japan Welding Society, Vol. 66 (April, 2000), pp. 72-73.

A fracture is generated in a silicon wafer from a starting point region for cutting formed by a molten processed region, acting as a start point, toward a cross section, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the starting point region for cutting to the front and rear faces of the silicon wafer encompasses a case where the fracture grows from a state where the molten processed region forming the starting point region for cutting is molten and a case where the fracture grows when the molten processed region forming the starting point region for cutting is re-solidified from the molten state. In either case, the molten processed region is formed only within the silicon wafer, and thus is present only within the cut section after cutting as shown in FIG. 12. When a starting point region for cutting is formed within the object by a molten processed region as such, unnecessary fractures deviating from a line to cut are harder to occur at the time of cleaving, whereby cleavage control becomes easier.

(3) Case where the modified region is a refractive index changed region

An object to be processed (e.g., glass) is irradiated with laser light while locating a light-converging point within the object under a condition with a field intensity of at least $1\times10^8$ (W/cm$^2$) at the light-converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1\times10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November 1997), pp. 105-111.

While the cases (1) to (3) are explained in the foregoing as a modified region formed by multiphoton absorption, a starting point region for cutting may be formed as follows while taking account of the crystal structure of a wafer-like object to be processed and its cleavage characteristic, whereby the object can be cut with a high precision by a smaller force from the starting point region for cutting acting as a start point.

Namely, in the case of a substrate made of a monocrystal semiconductor having a diamond structure such as silicon, it will be preferred if a starting point region for cutting is formed in a direction extending along a (111) plane (first cleavage plane) or a (110) plane (second cleavage plane). In the case of a substrate made of a III-V family compound semiconductor of sphalerite structure such as GaAs, it will be preferred if a starting point region for cutting is formed in a direction extending along a (110) plane. In the case of a substrate having a crystal structure of hexagonal system such as sapphire ($Al_2O_3$), it will be preferred if a starting point region for cutting is formed in a direction extending along a (1120) plane (A plane) or a (1100) plane (M plane) while using a (0001) plane (C plane) as a principal plane.

When the substrate is formed with an orientation flat in a direction to be formed with the above-mentioned starting point region for cutting (e.g., a direction extending along a (111) plane in a monocrystal silicon substrate) or a direction orthogonal to the direction to be formed therewith, the starting point region for cutting extending in the direction to be formed with the starting point region for cutting can be formed easily and accurately with reference to the orientation flat.

FIRST EMBODIMENT

Figure 14:
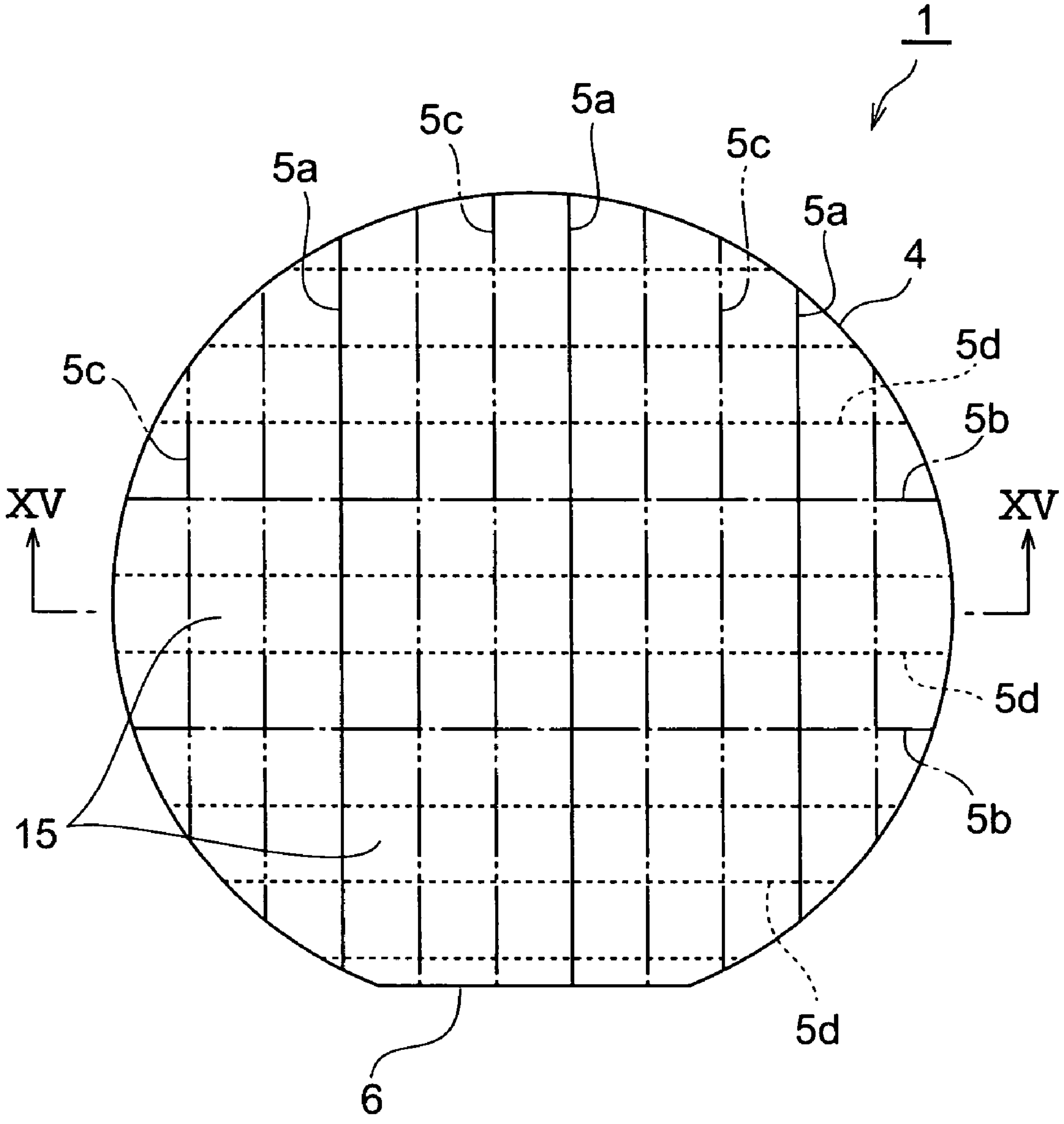
FIG. 14 is a plan view of the object to be processed in the laser processing method in accordance with a first embodiment.

A first embodiment of the present invention will now be explained. FIG. 14 is a plan view of the object to be processed in the laser processing method in accordance with the first embodiment, whereas FIG. 15 is a partly sectional view of the object taken along the line XV-XV of FIG. 14.

Figure 15:
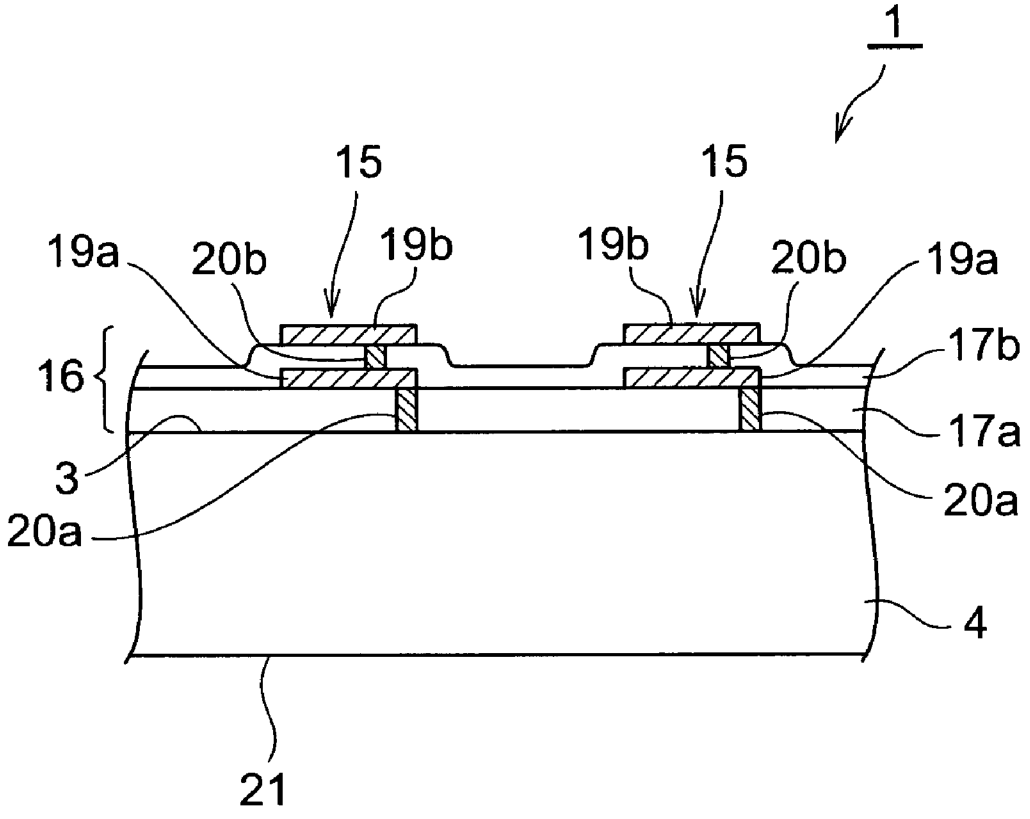
FIG. 15 is a partly sectional view of the object taken along the line XV-XV of FIG. 14.

As shown in FIGS. 14 and 15, the object to be processed 1 comprises a substrate 4 made of silicon and a laminate part 16, formed on a front face 3 of the substrate 4, including a plurality of functional devices 15. Each functional device 15 comprises an interlayer insulating film 17*a* laminated on the front face 3 of the substrate 4, a wiring layer 19*a* disposed on the interlayer insulating film 17*a*, an interlayer insulating film 17*b* laminated on the interlayer insulating film 17*a* so as to cover the wiring layer 19*a*, and a wiring layer 19*b* disposed on the interlayer insulating film 17*b*. The wiring layer 19*a* and the substrate 4 are electrically connected to each other by a conductive plug 20*a* penetrating through the interlayer insulating film 17*a*, whereas the wiring layers 19*a* and 19*b* are electrically connected to each other by a conductive plug 20*b* penetrating through the interlayer insulating film 17*b*.

A number of functional devices 15 are formed like a matrix in directions parallel and perpendicular to an orientation flat 6 of the substrate 4, whereas the interlayer insulating films 17*a*, 17*b* are formed between neighboring functional devices 15, 15 so as to cover the whole front face 3 of the substrate 4.

Figure 16:
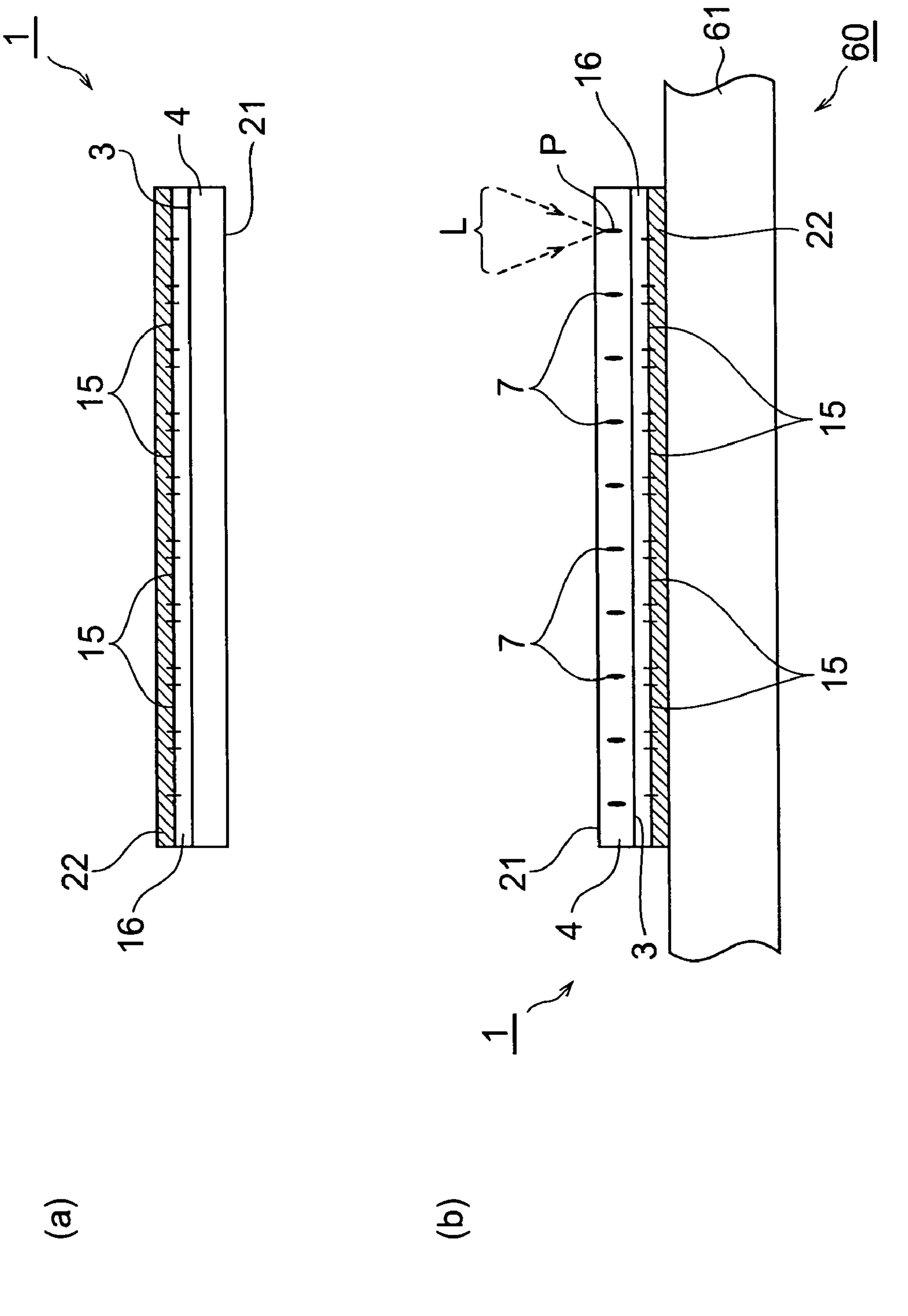
FIG. 16 is a view for explaining the laser processing method in accordance with the first embodiment, in which (a)

Thus configured object 1 is cut into the functional devices 15 in the following manner. First, as shown in FIG. 16(*a*), a protective tape 22 is bonded to the object 1 so as to cover the laminate part 16. Subsequently, as shown in FIG. 16(*b*), the object 1 is fixed onto a mounting table 61 of a laser processing apparatus 60 such that the rear face 21 of the substrate 4 faces up. Here, the protective tape 22 prevents the laminate part 16 from directly coming into contact with the mounting table 61, whereby each functional device 15 can be protected.

Then, lines to cut 5*a*, 5*b*, 5*c*, 5*d* are set like grids so as to pass between neighboring functional devices 15, 15. More specifically, as shown in FIG. 14, a plurality of lines to cut 5*a* extending in directions perpendicular to the orientation flat 6 are set so as to pass between functional devices 15, 15 while taking intervals each corresponding to a plurality of rows of functional devices, whereas a plurality of lines to cut 5*b* extending in directions parallel to the orientation flat 6 are set so as to pass between functional devices 15, 15 while taking intervals each corresponding to a plurality of rows of functional devices 15, 15. Further, a plurality of lines to cut 5*c* extending in directions perpendicular to the orientation flat 6 are set so as to pass between functional devices 15, 15 in which the lines to cut 5*a* are not set, whereas a plurality of lines to cut 5*d* extending in directions parallel to the orientation flat 6 are set so as to pass between functional devices 15, 15 in which the lines to cut 5*b* are not set.

After the lines to cut 5*a* to 5*d* are set as such, the substrate 4 is irradiated with laser light L which is a pulsed wave, while using the rear face 21 as a laser light entrance surface and positioning a light-converging point P within the substrate 4 as shown in FIG. 16(*b*) under a condition generating multiphoton absorption, and the mounting table 61 is moved so as to scan the light-converging point P along the lines to cut 5*a* to 5*d*. Here, the light-converging point P is scanned along the lines to cut 5*a* three times with different distances from the rear face 21 to the position at which light-converging point P is located, and along the lines to cut 5*b* twice with different distances from the rear face 21 to the position at which the light-converging point P is located (and only once along the lines to cut 5*c*, 5*d*).

Consequently, three rows of modified regions 7*a* are formed within the substrate 4 along the lines to cut 5*a* as shown in FIG. 19(*a*), whereas two rows of modified regions 7*b* are formed within the substrate 4 along the lines to cut 5*b* as shown in FIG. 19(*b*). Further, one row of modified region 7*c* is formed within the substrate 4 along the lines to cut 5*c* as shown in FIG. 19(*c*), whereas one row of modified region 7*d* is formed within the substrate 4 along the lines to cut 5*d* as shown in FIG. 19(*d*). Since the substrate 4 is a semiconductor substrate made of silicon, each of the modified regions 7*a* to 7*d* is a molten processed region.

While the modified regions 7*a* to 7*c* are formed upon irradiation with one pulse of laser light at intervals of 4 to 7 μm and thus are easier to cause the substrate 4 to fracture, the modified regions 7*d* are formed at intervals of 1 μm or less and thus are harder to cause the substrate 4 to fracture. Though the modified regions 7*a* to 7*c* are formed by the same size at the same intervals upon irradiation with one pulse of laser light, the number of rows increases in the ascending order of modified regions 7*c*, 7*b*, and 7*a*, whereby the modified regions 7*c*, 7*b*, and 7*a* are easier to cause the substrate 4 fracture in the ascending order. As a consequence, the modified regions 7*c*, 7*b*, 7*a* are easier to cause the substrate 4 to fracture than are the modified regions 7*d*, 7*c*, 7*b*, respectively.

After forming the modified regions 7*a* to 7*d*, a circular expandable tape (expandable film) 23 is bonded to the rear face 21 of the substrate 4 of the object 1 as shown in FIG. 17(*a*) with a tape applicator (not depicted). This expandable tape 23 has. an outer peripheral part bonded to a ring-shaped tape fixing frame 24, and thus is secured to the tape fixing frame 24.

Subsequently, as shown in FIG. 17(*b*), the object 1 having the expandable tape 23 bonded to the rear face 21 of the substrate 4 is transferred to a film expanding apparatus 70, where a ring-shaped receiving member 71 and a ring-shaped holding member 72 hold the tape fixing frame 24 therebetween, so as to mount the object to the film expanding apparatus 70. In this state, the protective tape 22 is irradiated with UV rays, so as to lower its adhesive force, and the protective tape 22 is peeled off from the laminate part 16 of the object 1 as shown in FIG. 18(*a*).

Then, as shown in FIG. 18(*b*), a cylindrical pressing member 73 disposed inside the receiving member 71 is raised from under the expandable tape 23, so as to expand the expandable tape 23. This generates fractures from the modified regions 7*a* to 7*d* acting as start regions, thereby cutting the substrate 4 and laminate part 16 along the lines to cut 5*a* to 5*d*, thereby yielding a plurality of semiconductor chips 25, each chip 25 including at least one of the functional devices 15 and separating the semiconductor chips 25 obtained by the cutting from each other.

The step of expanding the expandable tape 23 will now be explained in more detail. As shown in FIG. 20, the object 1 having the expandable tape 23 bonded thereto is mounted to the film expanding apparatus 70 (not depicted), and the pressing member 73 (not depicted) is raised, so as to expand the expandable tape 23 radially in a uniform fashion.

Consequently, as shown in FIG. 21(*a*), the object 1 is cut into a plurality of blocks 1*a* along the lines to cut 5*a* (i.e., as fractures occur from the modified regions 7*a* acting as start points). Subsequently, as shown in FIG. 21(*b*), each block 1*a* is cut into a plurality of blocks 1*b* along the lines to cut 5*b* (i.e., as fractures occur from the modified regions 7*b* acting as start points). Further, as shown in FIG. 22(*a*), each block 1*b* is cut into a plurality of blocks 1*c* along the lines to cut 5*c* (i.e., as fractures occur from the modified regions 7*c* acting as start points). Subsequently, as shown in FIG. 22(*b*), each block 1*c* is cut into a plurality of semiconductor chips 25 along the lines to cut 5*d* (i.e., as fractures occur from the modified regions 7*d* acting as start points).

The object 1 is cut stepwise into a plurality of semiconductor chips 25 as such, since the modified regions 7*c*, 7*b*, 7*a* are easier to cause the substrate 4 to fracture than are the modified regions 7*d*, 7*c*, 7*b*, respectively. The cutting of the blocks 1*a* into the blocks 1*b* along the lines to cut 5*b* may start before the cutting of the object 1 into the blocks 1*a* along the lines to cut 5*a* is completed. The same holds in the cutting along the other lines to cut 5*c*, 5*d*.

As explained in the foregoing, the modified regions 7*a* to 7*d* which differ from each other in terms of easiness to cause the substrate 4 to fracture are formed along the modified regions 5*a* to 5*d*, respectively. Therefore, when the expandable tape 23 is bonded to the rear face 21 of the substrate 4 and expanded, the object 1 is cut stepwise into a plurality of semiconductor chips 25. Such stepwise cutting allows uniform tensile stresses to act on respective parts extending along the lines to cut 5*a* to 5*d* (i.e., parts to become cut sections of the semiconductor chips 25), whereby the interlayer insulating films 17*a*, 17*b* on the lines to cut 5*a* to 5*d* are cut with a high precision along the lines to cut 5*a* to 5*d* together with the substrate 4. Therefore, when cutting the substrate 4 formed with the laminate part 16 including a plurality of functional devices 15 into a plurality of semiconductor chips 25, the laser processing method in accordance with the first embodiment can cut the laminate part 16 with a high precision together with the substrate 4.

Depending on the species and number of laminated layers of the laminate part 16 on the lines to cut 5*a* to 5*d*, there are cases where the laminate part 16 cannot be cut with a high precision unless a large tensile stress is exerted on parts extending along the lines to cut 5*a* to 5*d*. This means that modified regions 7*a* to 7*d* which allow a large tensile stress to act on the parts extending along the lines to cut 5*a* to 5*d* (i.e., modified regions 7*a* to 7*d* which are hard to cause the substrate 4 to fracture) at the time of expanding the expandable tape 23 should be formed.

When the modified regions 7*a* to 7*d* are formed in the same forming condition, it is hard to cut the laminated part 16 with a high precision along the lines to cut 5*a* to 5*d* together with the substrate 4 no matter how the modified regions 7*a* to 7*d* hard to cause the substrate 4 to fracture are formed. This is because of the fact that it is substantially impossible to apply uniform tensile stresses to all of the parts extending along the lines to cut 5*a* to 5*d*. Therefore, the laminate part 16 is hard to cut with a high precision along the lines to cut 5*a* to 5*d* together with the substrate 4. Also, as the semiconductor chips 25 decrease their size relative to the substrate 4, it becomes harder to cut and separate the substrate 4 and laminate part 16 by expanding the expandable tape 23, whereby uncut parts may occur.

When the object 1 is cut stepwise into a plurality of semiconductor chips 25 by using the laser processing method in accordance with the first embodiment, however, the problem mentioned above can be overcome.

Namely, when cutting relatively large things such as the object 1 and blocks 1*a*, the laminate part 16 on the lines to cut 5*a*, 5*b* can be cut with a high precision even if the substrate 4 is formed with the modified regions 7*a*, 7*b* easier to cause the substrate 4 to fracture. This seems to be because the parts extending along the lines to cut 5*a*, 5*b* have relatively large cross-sectional areas so that the tensile stress required for cutting increases. It also seems to be because the object 1 and blocks 1*a* to cut are relatively large so that the area bonded to the expandable tape 23 becomes greater, whereby the cutting of the object 1 into a plurality of blocks 1*a* and the cutting of each block 1*a* into a plurality of blocks 1*b* are performed while in a state where tensile stresses act strongly.

In the case where the hard-to-cut laminate part 16 is formed on the substrate 4, the cutting of each block 1*b* into a plurality of blocks 1*c* and the cutting of each block 1*c* into a plurality of semiconductor chips 25 are performed with a high precision even when the modified regions 7*c*, 7*d* harder to cause the substrate 4 to fracture are formed so as to cut the laminate part 16 with a high precision. This is because the blocks 1*c* are smaller than the blocks 1*b*, and the semiconductor chips 25 are smaller than the blocks 1*c*, whereby uniform tensile stresses are likely to act on the parts extending along the lines to cut 5*c*, 5*d*.

Here, the cut states of the object 1 and semiconductor chips 25 in the cases where the object 1 was cut stepwise into a plurality of semiconductor chips 25 (the laser processing method in accordance with the first embodiment) and not will be studied. The case not cut stepwise refers to a case where modified regions 7 were formed under the same forming condition along the lines to cut 5*a* to 5*d*.

First, in the cut state of the object 1, there was a case where the object 1 left a part not cut into the semiconductor chips 25 as shown in FIG. 23(*a*) when not cut stepwise. When cut stepwise, by contrast, the whole object 1 was reliably cut into the semiconductor chips 25 as shown in FIG. 23(*b*).

Next, in the cut state of the semiconductor chips 25, there was a case where the interlayer insulating films 17*a*, 17*b* were not cut with a high precision in the semiconductor chips 25, whereby peeling occurred, for example. When cut stepwise, by contrast, the interlayer insulating films 17*a*, 17*b* were cut with a high precision in the semiconductor chips 25 as shown in FIG. 24(*b*).

SECOND EMBODIMENT

A second embodiment of the present invention will now be explained. The laser processing method in accordance with the second embodiment differs from the laser processing method in accordance with the first embodiment in that how modified regions are formed with respect to the substrate 4 of the object 1.

Namely, as shown in FIG. 25, a plurality of lines to cut 5*a* extending in directions perpendicular and parallel to the orientation flat 6 are set so as to pass between functional devices

15, 15 while taking intervals each corresponding to a plurality of rows of functional devices. Further, a plurality of lines to cut 5*b* extending in directions perpendicular to the orientation flat 6 are set so as to pass between functional devices 15, 15 in which the lines to cut 5*a* are not set, whereas a plurality of lines to cut 5*c* extending in directions parallel to the orientation flat 6 are set so as to pass between functional devices 15, 15 in which the lines to cut 5*a* are not set.

Then, modified regions 7*a* shown in FIG. 19(*a*) are formed within the substrate 4 along the lines to cut 5*a*. Further, modified regions 7*b* shown in FIG. 19(*b*) are formed within the substrate 4 along the lines to cut 5*b*, whereas modified regions 7*c* shown in FIG. 19(*c*) are formed within the substrate 4 along the lines to cut 5*c*.

After forming the modified regions 7*a* to 7*c*, the object 1 having the expandable tape 23 bonded thereto as shown in FIG. 26(*a*) is mounted to the film expanding apparatus 70 (not depicted), and the pressing member 73 (not depicted) is raised, so as to expand the expandable tape 23 radially thereof in a uniform fashion.

Then, as shown in FIG. 26(*b*), the object 1 is cut into a plurality of blocks 1*a* along the lines to cut 5*a* (i.e., as fractures occur from the modified regions 7*a* acting as start points). Further, as shown in FIG. 27(*a*), each block 1*a* is cut into a plurality of blocks 1*b* along the lines to cut 5*b* (i.e., as fractures occur from the modified regions 7*b* acting as start points). Subsequently, as shown in FIG. 27(*b*), each block 1*b* is cut into a plurality of semiconductor chips 25 along the lines to cut 5*c* (i.e., as fractures occur from the modified regions 7*c* acting as start points).

The object 1 is cut stepwise into a plurality of semiconductor chips 25 as such, since the modified regions 7*b* and 7*a* are easier to cause the substrate 4 to fracture than are the modified regions 7*c* and 7*b*, respectively. The cutting of the blocks 1*a* into the blocks 1*b* along the lines to cut 5*b* may start before the cutting of the object 1 into the blocks 1*a* along the lines to cut 5*a* is completed. The same holds in the cutting along the lines to cut 5*c*.

As explained in the foregoing, the laser processing method in accordance with the second embodiment cuts the object 1 stepwise into a plurality of semiconductor chips 25 as with the laser processing method in accordance with the first embodiment. This allows uniform tensile stresses to act on respective parts extending along the lines to cut 5*a* to 5*c* (i.e., parts to become cut sections of the semiconductor chips 25), whereby the interlayer insulating films 17*a*, 17*b* on the lines to cut 5*a* to 5*c* are cut with a high precision along the lines to cut 5*a* to 5*c* together with the substrate 4. Therefore, when cutting the substrate 4 formed with the laminate part 16 including a plurality of functional devices 15 into a plurality of semiconductor chips 25, the laser processing method in accordance with the second embodiment can cut the laminate part 16 with a high precision together with the substrate 4.

THIRD EMBODIMENT

A third embodiment of the present invention will now be explained. The laser processing method in accordance with the third embodiment differs from the laser processing method in accordance with the first embodiment in terms of how the expandable tape 23 is expanded.

Namely, as shown in FIG. 28, a plurality of lines to cut 5*a* extending in directions perpendicular to the orientation flat 6 are set so as to pass between functional devices 15, 15 while taking intervals each corresponding to a plurality of rows of functional devices, whereas a plurality of lines to cut 5*b* extending in directions parallel to the orientation flat 6 are set so as to pass between functional devices 15, 15 while taking intervals each corresponding to a plurality of rows of functional devices 15, 15. Further, a plurality of lines to cut 5*c* extending in directions perpendicular to the orientation flat 6 are set so as to pass between functional devices 15, 15 in which the lines to cut 5*a* are not set, whereas a plurality of lines to cut 5*d* extending in directions parallel to the orientation flat 6 are set so as to pass between functional devices 15, 15 in which the lines to cut 5*b* are not set.

Then, modified regions 7*a* shown in FIG. 19(*a*) are formed within the substrate 4 along the lines to cut 5*a*, whereas modified regions 7*b* shown in FIG. 19(*b*) are formed within the substrate 4 along the lines to cut 5*b*. Further, modified regions 7*c* shown in FIG. 19(*c*) are formed within the substrate 4 along the lines to cut 5*c*, whereas modified regions 7*d* shown in FIG. 19(*d*) are formed within the substrate 4 along the lines to cut 5*d*.

After forming the modified regions 7*a* to 7*d*, a rectangular expandable tape 23 is bonded to the rear face 21 of the substrate 4 of the object 1 as shown in FIG. 29. Then, the expandable tape 23 is initially expanded in a direction parallel to the orientation flat 6 as shown in FIG. 30(*a*), so as to cut the object 1 into a plurality of blocks 1*a* along the lines to cut 5*a* (i.e., by generating fractures from the modified regions 7*a* acting as start points). Subsequently, the expandable tape 23 is expanded in a direction perpendicular to the orientation flat 6 as shown in FIG. 30(*b*), so as to cut each block 1*a* into a plurality of blocks 1*b* along the lines to cut 5*b* (i.e., by generating fractures from the modified regions 7*b* acting as start points).

Further, the expandable tape 23 is expanded in a direction parallel to the orientation flat 6 as shown in FIG. 31(*a*), so as to cut each block 1*b* into a plurality of blocks 1*c* along the lines to cut 5*c* (i.e., by generating fractures from the modified regions 7*c* acting as start points). Subsequently, the expandable tape 23 is expanded in a direction perpendicular to the orientation flat 6 as shown in FIG. 31(*b*), so as to cut each block 1*c* into a plurality of semiconductor chips 25 along the lines to cut 5*d* (i.e., by generating fractures from the modified regions 7*d* acting as start points).

In the second expansion of the expandable tape 23 in the direction parallel to the orientation flat 6, a pressing member having an upper face curved about a direction perpendicular to the orientation flat 6 may be raised, so as to exert a bending stress on each block 1*b*. In the second expansion of the expandable tape 23 in the direction perpendicular to the orientation flat 6, a pressing member having an upper face curved about a direction parallel to the orientation flat 6 may be raised, so as to exert a bending stress on each block 1*c*. See, for example, FIG. 1 of Japanese Patent Application Laid-Open No. 2002-184723 for such a pressing member.

As explained in the foregoing, the laser processing method in accordance with the third embodiment cuts the object 1 stepwise into a plurality of semiconductor chips 25 as with the laser processing method in accordance with the first embodiment. This allows uniform tensile stresses to act on respective parts extending along the lines to cut 5*a* to 5*d* (i.e., parts to become cut sections of the semiconductor chips 25), whereby the interlayer insulating films 17*a*, 17*b* on the lines to cut 5*a* to 5*d* are cut with a high precision along the lines to cut 5*a* to 5*d* together with the substrate 4. Therefore, when cutting the substrate 4 formed with the laminate part 16 including a plurality of functional devices 15 into a plurality of semiconductor chips 25, the laser processing method in accordance with the third embodiment can also cut the laminate part 16 with a high precision together with the substrate 4.

FOURTH EMBODIMENT

A fourth embodiment of the present invention will now be explained. The laser processing method in accordance with the fourth embodiment differs from the laser processing method in accordance with the first embodiment in terms of how modified regions are formed with respect to the substrate 4 of the object 1 and how the expandable tape 23 is expanded.

Namely, as shown in FIG. 32, a plurality of lines to cut 5*a* extending in directions perpendicular to the orientation flat 6 are set so as to pass between functional devices 15, 15 while taking intervals each corresponding to a plurality of rows of functional devices, whereas a plurality of lines to cut 5*c* extending in directions parallel to the orientation flat 6 are set so as to pass between functional devices 15, 15 while taking intervals each corresponding to a plurality of rows of functional devices 15, 15. Further, a plurality of lines to cut 5*b* extending in directions perpendicular to the orientation flat 6 are set so as to pass between functional devices 15, 15 in which the lines to cut 5*a* are not set, whereas a plurality of lines to cut 5*d* extending in directions parallel to the orientation flat 6 are set so as to pass between functional devices 15, 15 in which the lines to cut 5*c* are not set.

Then, modified regions 7*a* shown in FIG. 19(*a*) are formed within the substrate 4 along the lines to cut 5*a*, whereas modified regions 7*b* shown in FIG. 19(*b*) are formed within the substrate 4 along the lines to cut 5*b*. Further, modified regions 7*c* shown in FIG. 19(*c*) are formed within the substrate 4 along the lines to cut 5*c*, whereas modified regions 7*d* shown in FIG. 19(*d*) are formed within the substrate 4 along the lines to cut 5*d*.

After forming the modified regions 7*a* to 7*d*, a rectangular expandable tape 23 is bonded to the rear face 21 of the substrate 4 of the object 1 as shown in FIG. 33, and is expanded in a direction parallel to the orientation flat 6. Then, as shown in FIG. 34(*a*), the object 1 is cut into a plurality of blocks 1*a* along the lines to cut 5*a* (i.e., as fractures occur from the modified regions 7*a* acting as start points). Subsequently, as shown in FIG. 34(*b*), each block 1*a* is cut into a plurality of blocks 1*b* along the lines to cut 5*b* (i.e., as fractures occur from the modified regions 7*b* acting as start points).

The object 1 is cut stepwise into a plurality of blocks 1*b* as such, since the modified region 7*a* is easier to cause the substrate 4 to fracture than is the modified region 7*b*. The cutting of the blocks 1*a* into the blocks 1*b* along the lines to cut 5*b* may start before the cutting of the object 1 into the blocks 1*a* along the lines to cut 5*a* is completed.

Next, the expandable tape 23 is expanded in a direction perpendicular to the orientation flat 6. Then, as shown in FIG. 35(*a*), each block 1*b* is cut into a plurality of blocks 1*c* along the lines to cut 5*a* (i.e., as fractures occur from the modified regions 7*c* acting as start points). Subsequently, as shown in FIG. 35(*b*), each block 1*c* is cut into a plurality of semiconductor chips 25 along the lines to cut 5*d* (i.e., as fractures occur from the modified regions 7*d* acting as start points).

Each block 1*b* is cut stepwise into a plurality of semiconductor chips 25 as such, since the modified region 7*c* is easier to cause the substrate 4 to fracture than is the modified region 7*d*. The cutting of the blocks 1*c* into the semiconductor chips 25 along the lines to cut 5*d* may start before the cutting of the blocks 1*b* into the blocks 1*c* along the lines to cut 5*c* is completed.

As explained in the foregoing, the laser processing method in accordance with the fourth embodiment cuts the object 1 stepwise into a plurality of semiconductor chips 25 as with the laser processing method in accordance with the first embodiment. This allows uniform tensile stresses to act on respective parts extending along the lines to cut 5*a* to 5*d* (i.e., parts to become cut sections of the semiconductor chips 25), whereby the interlayer insulating films 17*a*, 17*b* on the lines to cut 5*a* to 5*d* are cut with a high precision along the lines to cut 5*a* to 5*d* together with the substrate 4. Therefore, when cutting the substrate 4 formed with the laminate part 16 including a plurality of functional devices 15 into a plurality of semiconductor chips 25, the laser processing method in accordance with the fourth embodiment can also cut the laminate part 16 with a high precision together with the substrate 4.

The present invention is not limited to the above-mentioned first to fourth embodiments. For example, though the above-mentioned embodiments relate to cases where the modified regions 7*a* to 7*d* are formed by generating multiphoton absorption within the substrate 4, there are cases where the modified regions 7*a* to 7*d* can be formed by generating optical absorption equivalent to multiphoton absorption within the substrate 4.

Though the above-mentioned embodiments relate to cases where the modified regions 7*a* to 7*d* are formed within the substrate 4 while using the rear face 21 of the substrate 4 as a laser light entrance surface, the modified regions 7*a* to 7*d* may be formed within the substrate 4 while using the front face 3 of the substrate 4 as the laser light entrance surface. Using the rear face 21 of the substrate 4 as the laser light entrance surface is effective in particular when a member (e.g., TEG) reflecting the laser light L exists on a line to cut 5 of the laminate part 16. When no member reflecting the laser light L exists on the line to cut 5 in the laminate part 16, so that the laser light L passes through the laminate part 16, the modified regions 7*a* to 7*d* may be formed within the substrate 4 while using the front face 3 of the substrate 4 as the laser light entrance surface.

In order for the modified regions 7*a* to 7*d* differing from each other in terms of easiness to cause the substrate 4 to fracture to be formed along the respective lines to cut 5*a* to 5*d*, the modified regions 7*a* to 7*d* may be formed in the following manner.

Namely, two rows of modified regions 7*a* are formed within the substrate 4 along the lines to cut 5*a* as shown in FIG. 36(*a*), whereas two rows of modified regions 7*b* are formed within the substrate 4 along the lines to cut 5*b* as shown in FIG. 36(*b*). Here, the modified regions 7*a* are formed by the laser light L with a greater energy, so as to become greater mainly in the thickness direction of the substrate 4 and easier to cause the substrate 4 to fracture, whereas the modified regions 7*b* are formed by the laser light L with a smaller energy, so as to become smaller mainly in the thickness direction of the substrate 4 and harder to cause the substrate 4 to fracture.

One row of modified region 7*c* is formed within the substrate 4 along the lines to cut 5*c* as shown in FIG. 36(*c*), whereas one row of modified region 7*d* is formed within the substrate 4 along the lines to cut 5*d* as shown in FIG. 36(*d*). Here, the modified regions 7*a* to 7*c* are formed upon irradiation with one pulse of laser light at intervals of 4 to 7 μm and thus are easier to cause the substrate 4 to fracture, whereas the modified regions 7*d* are formed at intervals of 1 μm or less and thus are harder to cause the substrate 4 to fracture. The modified regions 7*b* and 7*c* are formed by similar energy levels of laser light L, and thus have similar sizes mainly in the thickness direction of the substrate 4.

As in the foregoing, the modified regions 7*c*, 7*b*, and 7*a* are easier to cause the substrate 4 to fracture than are the modified regions 7*d*, 7*c*, and 7*b*, respectively.

One row of modified region 7*a* is formed within the substrate 4 at positions near the rear face 21 (i.e., at positions allowing fractures to reach the rear face 21) along the lines to cut 5*a* as shown in FIG. 37(*a*), whereas one row of modified region 7*b* is formed within the substrate 4 at positions farther from the rear face 21 than is the modified region 7*a* along the lines to cut 5*b* as shown in FIG. 37(*b*). One row of modified region 7*c* is formed within the substrate 4 at positions farther from the rear face 21 than is the modified region 7*b* along the lines to cut 5*c* as shown in FIG. 37(*c*), whereas one row of modified region 7*d* is formed within the substrate 4 at positions farther from the rear face 21 than is the modified region 7*c* (i.e., at a center part of the substrate 4 in the thickness direction) along the lines to cut 5*d* as shown in FIG. 37(*d*).

This makes the modified regions 7*c*, 7*b*, and 7*a* easier to cause the substrate 4 to fracture than are the modified regions 7*d*, 7*c*, and 7*b*, respectively. Forming respective rows of modified regions 7*a* to 7*d* at different positions in the thickness direction of the substrate 4 so as to make them different from each other in terms of easiness to cause the substrate 4 fracture as such is effective in particular when the substrate 4 is thin (e.g., when its thickness is 100 μm or less).

Also, when any of the forming conditions (1) to (7) shown in FIGS. 38 and 39 is chosen as appropriate, and modified regions 7 are formed under different forming conditions in conformity to their corresponding lines to cut 5, the easiness to cause the substrate 4 to fracture can be changed according to the lines to cut 5. The forming conditions (1) to (7) are conditions where the substrate 4 is made of silicon and has a thickness of 300 μm.

Operations of the modified regions in FIGS. 38 and 39 are as follows:

HC (half cut) modified region: Formed on the rear face 21 side of the substrate 4, thereby generating fractures in the rear face 21 along the lines to cut 5.

Divided modified region: Mainly generates fractures in the substrate 4 along the lines to cut 5 by expanding the expandable tape 23.

Quality modified region: Formed on the front face 3 side of the substrate 4, thereby generating fractures in the laminate part 16 along the lines to cut 5 by expanding the expandable tape 23.

Time difference modified region: Formed between the divided modified region and quality modified region, thereby adjusting the time required for the object 1 to be cut along the lines to cut 5 after the expandable tape 23 begins to expand.

In FIGS. 38 and 39, the light-converging position refers to the distance from the rear face 21 to a position at which the light-converging point P of the laser light L is located, whereas the energy refers to the energy of the laser light L at the time when forming each modified region.

The remaining width refers to the distance (along the thickness direction of the substrate 4) between the rear-side end part of a quality modified region and the front-side end face part of a time difference modified region which oppose each other. Here, the rear-side end part of the quality modified region refers to an "average position in the thickness direction of the substrate 4" of the end part on the rear face 21 side of the quality modified region formed along the line to cut 5, whereas the front-side end part of the time difference modified region refers to an "average position in the thickness direction of the substrate 4" of the end part on the front face 3 side of the time difference modified region formed along the line to cut 5. In the forming conditions (1) and (7), no time difference modified regions are formed, whereby the remaining width refers to the rear-side end part of a quality modified region and the front-side end part of a divided modified region which oppose each other.

The cut time refers to the time required for the object 1 to be cut along the lines to cut 5 after the expandable tape 23 begins to expand. Here, the expandable tape 23 was expanded at a rate of 5 mm/s.

INDUSTRIAL APPLICABILITY

When cutting a substrate formed with a laminate part including a plurality of functional devices into a plurality of chips, each chip including at least one of the functional devices, the present invention makes it possible to cut the laminate part with a high accuracy together with the substrate.

The invention claimed is:

1. A laser processing method for irradiating a substrate having a front face formed with a laminate part including a plurality of functional devices with laser light while locating a light-converging point within the substrate, so as to form a modified region to become a start point for cutting within the substrate along a line to cut the substrate;

the method comprising the steps of:

forming a first modified region along a first line to cut for cutting the substrate and laminate part into a plurality of blocks; and forming a second modified region along a second line to cut for cutting the blocks into a plurality of chips, each chip including at least one of the functional devices;

wherein the first modified region is more likely to cause the substrate to fracture than is the second modified region.

2. A laser processing method according to claim 1, further comprising the steps of:

attaching an expandable film to a rear face of the substrate formed with the first and second modified regions; and expanding the expandable film, so as to start cutting the substrate and laminate part into the blocks from the first modified region acting as a start point, and then start cutting the blocks into the chips from the second modified region acting as a start point.

3. A laser processing method according to claim 1, wherein the second line to cut passes between first lines to cut neighboring each other.

4. A laser processing method according to claim 1, wherein the first and second lines to cut are substantially parallel to each other.

5. A laser processing method according to claim 1, wherein the first and second lines to cut intersect each other.

6. A laser processing method according to claim 1, wherein the substrate is a semiconductor substrate; and wherein the first and second modified regions include a molten processed region.

7. A laser processing method according to claim 1, wherein the first modified region in a part extending along the first line to cut in the substrate has a forming density different from that of the second modified region in a part extending along the second line to cut in the substrate, so as to make the first modified region easier to generate a fracture in the substrate than is the second modified region.

8. A laser processing method according to claim 1, wherein the first modified region in a part extending along the first line to cut in the substrate has a size different from that of the second modified region in a part extending along the second line to cut in the substrate, so as to make the first modified region easier to generate a fracture in the substrate than is the second modified region.

9. A laser processing method according to claim 1, wherein the first modified region in a part extending along the first line to cut in the substrate is formed at a position different from a position where the second modified region is formed in a part extending along the second line to cut in the substrate, so as to make the first modified region easier to generate a fracture in the substrate than is the second modified region.

10. An object to be processed comprising a substrate and a laminate part, formed on a front face of the substrate, including a plurality of functional devices;

the object further comprising:

a first modified region formed within the substrate along a first line to cut for cutting the substrate and laminate into a plurality of blocks; and a second modified region formed within the substrate along a second line to cut for cutting the blocks into a plurality of chips, each chip including at least one of the functional devices;

wherein the first modified region is more likely to cause the substrate to fracture than is the second modified region.

* * * * *